United States Patent
Sheppard et al.

(10) Patent No.: US 12,148,001 B2
(45) Date of Patent: *Nov. 19, 2024

(54) METHODS AND APPARATUS TO ESTIMATE CENSUS LEVEL IMPRESSIONS AND UNIQUE AUDIENCE SIZES ACROSS DEMOGRAPHICS

(71) Applicant: The Nielsen Company (US), LLC, New York, NY (US)

(72) Inventors: Michael R. Sheppard, Holland, MI (US); Edward Murphy, North Stonington, CT (US); Beate Sissenich, New York, NY (US); Edmond Wong, New York, NY (US); Jing Liu, Jersey City, NJ (US); Ludo Daemen, Duffel (BE)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,330

(22) Filed: Apr. 18, 2022

(65) Prior Publication Data

US 2022/0253895 A1 Aug. 11, 2022

Related U.S. Application Data

(63) Continuation of application No. 16/697,876, filed on Nov. 27, 2019, now Pat. No. 11,308,514.

(Continued)

(51) Int. Cl.
*G06Q 30/02* (2023.01)
*G06Q 30/0242* (2023.01)

(52) U.S. Cl.
CPC .............................. *G06Q 30/0242* (2013.01)

(58) Field of Classification Search
CPC .............. G06Q 30/02; G06Q 30/0242; G06Q 30/0254; G06Q 10/067; G06Q 30/0246; G06Q 30/0207
See application file for complete search history.

(56) References Cited

U.S. PATENT DOCUMENTS

| | | | |
|---|---|---|---|
| 6,108,637 A | 8/2000 | Blumenau | |
| 8,370,489 B2 | 2/2013 | Mazumdar et al. | |

(Continued)

FOREIGN PATENT DOCUMENTS

| | | | | |
|---|---|---|---|---|
| CN | 108140204 A | * | 6/2018 | ............. G06Q 30/02 |
| KR | 101934841 | | 1/2019 | |

(Continued)

OTHER PUBLICATIONS

Li, guoqi; Zhao, Daxuan; Xu, Yi; Kuo, Shyh-Hao; Xu, Hai-Yan; Hu, Nan; Zhao, Guangshe; Monterola, Christopher; Gao, Zhong-Ke, Entopy Based modelling for Estimating Demographic Trends (English), PLoS ONE, 10(9), e0137324, Sep. 18, 2015 (Year: 2015).*

(Continued)

*Primary Examiner* — Marilyn G Macasiano

(57) ABSTRACT

A disclosed example includes determining a plurality of cross-demographic total census parameter values based on ratios of third-party impression counts and third-party audience sizes, selecting a first cross-demographic total census parameter value as an upper bound constraint from the plurality of cross-demographic total census parameter values based on comparisons between ones of the plurality of cross-demographic total census parameter values, selecting a second cross-demographic total census parameter value from the plurality of cross-demographic total census parameter values based on the second cross-demographic total census parameter value being less than the upper bound constraint, determining a first census-level audience size based on the second cross-demographic total census param- (Continued)

eter value, and determining a first census-level impression count based on the second cross-demographic total census parameter value.

21 Claims, 8 Drawing Sheets

Related U.S. Application Data

(60) Provisional application No. 62/891,826, filed on Aug. 26, 2019.

(56) References Cited

U.S. PATENT DOCUMENTS

| | | | |
|---|---|---|---|
| 8,572,019 | B2 | 10/2013 | Eggers et al. |
| 8,904,149 | B2 | 12/2014 | Eren et al. |
| 8,930,701 | B2 | 1/2015 | Burbank et al. |
| 9,237,138 | B2 | 1/2016 | Bosworth et al. |
| 9,870,486 | B2 | 1/2018 | Sullivan et al. |
| 9,979,614 | B2 | 5/2018 | Kalus et al. |
| 10,270,673 | B1 | 4/2019 | Sheppard et al. |
| 10,536,358 | B2 | 1/2020 | Sheppard et al. |
| 10,803,475 | B2 | 10/2020 | Rao et al. |
| 11,112,263 | B2 * | 9/2021 | Timor ............... G01C 21/367 |
| 11,276,073 | B2 | 3/2022 | Sheppard et al. |
| 11,308,514 | B2 | 4/2022 | Sheppard et al. |
| 2008/0004958 | A1 | 1/2008 | Ralph et al. |
| 2009/0265215 | A1 | 10/2009 | Lindstrom |
| 2010/0185516 | A1 * | 7/2010 | Swanson ............ G06Q 10/087 705/28 |
| 2010/0318413 | A1 * | 12/2010 | Zinkevich ............ G06Q 30/02 705/14.4 |
| 2013/0097312 | A1 | 4/2013 | Mazumdar et al. |
| 2013/0268351 | A1 | 10/2013 | Abraham et al. |
| 2015/0193816 | A1 | 7/2015 | Toupet et al. |
| 2015/0244820 | A1 * | 8/2015 | Verkasalo ............ G06F 16/958 707/740 |
| 2015/0262207 | A1 * | 9/2015 | Rao .................... G06Q 30/0201 705/7.32 |
| 2015/0324837 | A1 * | 11/2015 | Shimizu ............ G06Q 30/0242 705/14.43 |
| 2017/0061470 | A1 | 3/2017 | Sheppard et al. |
| 2018/0332177 | A1 * | 11/2018 | Shah ................... H04L 61/5084 |
| 2019/0057403 | A1 | 2/2019 | Sheppard et al. |
| 2019/0304205 | A1 | 10/2019 | Sheppard et al. |
| 2020/0007919 | A1 | 1/2020 | Sheppard et al. |
| 2020/0228427 | A1 | 7/2020 | Sheppard et al. |
| 2021/0065231 | A1 | 3/2021 | Sheppard et al. |
| 2021/0158376 | A1 | 5/2021 | Sheppard et al. |
| 2022/0058662 | A1 | 2/2022 | Sheppard et al. |
| 2022/0058664 | A1 | 2/2022 | Sheppard et al. |
| 2022/0253895 | A1 | 8/2022 | Sheppard et al. |

FOREIGN PATENT DOCUMENTS

| | | | |
|---|---|---|---|
| WO | 2014059319 | 4/2014 | |
| WO | WO 2017/040578 A1 * | 3/2017 | ............. G06Q 30/02 |
| WO | 2017054051 | 4/2017 | |

OTHER PUBLICATIONS

Kalimeri, Kyriaki; Beiro, Mariano G; Delfino, Mateo; Raleigh, Robert; Cattuto, Ciro, Predicting Demographics, Moral Foundations, and Human Values from Digital Bahaviors (English), Dec. 5, 2017 (Year: 2017).*

Eysenbach, G; Bright, R; Li, S; Novillo-Ortiz, D; Emmert, M; Holtz, B; Mejova, Y; Weber, I; Fernandez-Luque, L, Online Health Monitoring using Facebook Advertisement Audience Estimates in the United Stataes: Evaluation Study (English), JMIR Public Health and Surveillance, 4(1), e30, Mar. 28, 2018 (Year: 2018).*

"A Mathematical Theory of Communication," Wikipedia, Page last edited Sep. 27, 2019, Accessed Jan. 2, 2020, Retrieved from the Internet: <URL: https://en.wikipedia.org/wiki/A_Mathematical_Theory_of_Communication> 2 pages.

Shannon, C. E., "A Mathematical Theory of Communication," The Bell System Technical Journal, vol. 27, No. 3, pp. 379-423, 623-656, Jul. Oct. 1948, 55 pages.

"Entropy (information theory)," Wikipedia, Page last edited Dec. 23, 2019, Accessed Jan. 2, 2020, Retrieved from the Internet: <URL: https://en.wikipedia.org/wiki/Entropy_(information_theory)> 18 pages.

"Kullback—Leibler Divergence," Wikipedia, Page last edited Dec. 13, 2019, Accessed Jan. 2, 2020, Retrieved from the Internet: <https://en.wikipedia.org/wiki/Kullback%E2%80%93Leibler_divergence> 15 pages.

Kullback, S., and Leibler, R.A., "On Information and Sufficiency," The Annals of Mathematical Statistics, vol. 22, No. 1, pp. 79-86, 1951, 8 pages.

"Principle of Maximum Entropy," Wikipedia, Page last edited Nov. 8, 2019, Accessed Jan. 2, 2020, Retrieved from the Internet: <URL: https://en.wikipedia.org/wiki/Principle_of_maximum_entropy> 11 pages.

Jaynes, E. T., "Information Theory and Statistical Mechanics," The Physical Review, vol. 106, No. 4, pp. 620-630, May 15, 1957, 11 pages.

Jaynes, E.T., Probability Theory: The Logic of Science. Cambridge University Press, (2003), Retrieved from the Internet: <URL: http://www.med.mcgill.ca/epidemiology/hanley/bios601/GaussianModel/JaynesProbabilityTheory.pdf> 758 pages.

"Maximum Entropy Probability Distribution," Wikipedia, Page last edited Nov. 11, 2019, Accessed Jan. 2, 2020, Retrieved from the Internet: <URL: https://en.wikipedia.org/wiki/Maximum_entropy_probability_distribution#Discrete_distributions_with_specified_mean> 10 pages.

Kapur, J.N., and Kesavan, H.K., "Entropy Optimization Principles with Applications," Academic Press, San Diego, CA, 1992, pp. 52-55, 76-97, 307-329, 346-351, 388-395, and 401-405, 37 pages.

International Searching Authority, "International Search Report and Written Opinion," issued in connection with International Patent Application No. PCT/US2020/047822, dated Dec. 2, 2020, 10 pages.

International Bureau, "International Preliminary Report on Patentability," issued in connection with International Patent Application No. PCT/US2020/047822, dated Mar. 1, 2022, 6 pages.

Koehler et al., "A Method for Measuring Online Audiences," 2013, Google, Inc., 24 pages.

Dai, Wenyuan, et al., "Transferring Naive Bayes Classifiers for Text Classification," Department of Computer Science and Engineering, Shanghai Jiao Tong University, Shanghai, China, Proceedings of the 22nd National Conference on Artificial Intelligence, vol. 1, Jul. 22, 2007, 6 pages.

Trzcinski, Thomasz, "Analyse, Target & Advertise Privacy in mobile ads," Laboratory for Computer Communications and Applications, EPFL, Lausanne, Switzerland, Jan. 17, 2011, 8 pages.

Coffey, Steve, "Internet Audience Measurement: A Practitioner's View," Journal of Interactive Advertising, vol. 1, No. 2 (Spring 2001), 8 pages.

Kitts et al., "A Comparison of Algorithms for TV Ad Targeting," 2014 IEEE International Conference on Data Mining Workshop, pp. 296-305, Dec. 1, 2014, 3 pages.

United States Patent and Trademark Office, "Non-Final Office Action," issued in connection with U.S. Appl. No. 16/697,876, dated Mar. 30, 2021, 15 pages.

United States Patent and Trademark Office, "Notice of Allowance and Fee(s) Due," issued in connection with U.S. Appl. No. 16/697,876, dated Aug. 24, 2021, 12 pages.

United States Patent and Trademark Office, "Notice of Allowance and Fee(s) Due," issued in connection with U.S. Appl. No. 16/697,876, dated Dec. 23, 2021, 9 pages.

Kapur, J.N., and Kesavan, H.K., "Entropy Optimization Principles and Their Applications," in: Singh V.P., Fiorentino M. (eds) Entropy and Energy Dissipation in Water Resources, Water Science and Technology Library, vol. 9., pp. 3-20, Springer, Dordrecht, (1992), 18 pages.

(56) References Cited

OTHER PUBLICATIONS

Haggin et al., "Google Nears a Long-Tipped Limit on Tracking 'Cookies,' in Blow to Rivals," Wall St. Journal, 2019, 3 pages.
International Searching Authority, "International Preliminary Report on Patentability," connection with International Patent Application No. PCT/US2021/046743, issued Feb. 16, 2023, in 5 pages.
International Searching Authority, "International Search Report and Written Opinion," issued in connection PCT/US2021/046743, mailed Nov. 29, 2021, 8 pages.
Final rejection dated Mar. 22, 2024 in U.S. Appl. No. 17/406,858, 8 pages.

\* cited by examiner

```
function
[CensusAudience,CensusPageViews]=YTMetricViews(UniverseEstimate,UniqueAudience,
PageViews,CensusTotalViews)
%Solves the census level estimate of Audience and Pageviews across demos
%
% Input:
%   UniverseEstimate  : Universe Estimate (m x 1) across m demos
%   UniqueAudience    : Third-party (m x 1) unique audience
%   PageViews         : Third-party (m x 1) page views
%   CensusTotalViews  : Census Total (1 x 1) page views across all demos
% Output:
%   CensusAudience    : Estimated unique audience (m x 1) for each demo
%   CensusPageViews   : Estimated page views (m x 1) for each demo
%
%(note: .* and ./ represent element-wise operations across vectors)

f = PageViews ./ UniqueAudience;   %(m x 1) Frequency
fstar = max(f);   % (1x1) maximum frequency min_c=0;
max_c=(fstar/(fstar-1));

tol=100*eps;
```

502 {  (f, fstar lines)
504 {  (min_c, max_c lines)

FIG. 5A

```
%Use bisection method root-finding
%single-variable equation in a bounded interval keepgoing=true;
while keepgoing
    c = (min_c + max_c)/2;

%Solve CensusAudience
    numerator = UniqueAudience;              % (m x 1)
    term1 = PageViews;                        % (m x 1)
    term2 = (1./UniqueAudience) - (1./UniverseEstimate);  % (m x 1)
    term3 = (c-1)/c;                          % (1 x 1)
    denominator = 1 - term1.*term2.*term3;    % (m x 1)
    CensusAudience = numerator ./ denominator;

%Solve CensusPageViews
    numerator = CensusAudience;               % (m x 1)
    denominator = 1 - c.*(1 - (UniqueAudience./PageViews));  % (m x 1)
    CensusPageViews = numerator ./ denominator;  % (m x 1)

EstimatedTotalViews=sum(CensusPageViews);
```

FIG. 5B

```
diff_c = max_c-min_c;
if diff_c<tol
    keepgoing=false;
end
err = EstimatedTotalViews - CensusTotalViews; % Error (1 x 1)
if err>0
    %Too large, move upper bound for c down
    max_c = c;
else
    %Too small, move lower bound for c up
    min_c = c;
end
end
```

METHODS AND APPARATUS TO ESTIMATE CENSUS LEVEL IMPRESSIONS AND UNIQUE AUDIENCE SIZES ACROSS DEMOGRAPHICS

CROSS-REFERENCE TO RELATED APPLICATIONS

This patent arises from a continuation of U.S. patent application Ser. No. 16/697,876, entitled "METHODS AND APPARATUS TO ESTIMATE CENSUS LEVEL IMPRESSIONS AND UNIQUE AUDIENCE SIZES ACROSS DEMOGRAPHICS" and filed on Nov. 27, 2019, now U.S. Pat. No. 11,308,514, which claims priority to U.S. Provisional Patent Application No. 62/891,826, filed on Aug. 26, 2019, and entitled "METHODS AND APPARATUS TO ESTIMATE CENSUS LEVEL IMPRESSIONS AND UNIQUE AUDIENCE SIZES ACROSS DEMOGRAPHICS," both of which are hereby incorporated herein by reference in their entireties.

FIELD OF THE DISCLOSURE

This disclosure relates generally to computer processing, and, more particularly, to methods and apparatus to estimate census level impressions and unique audience sizes across demographics.

BACKGROUND

Tracking user access to digital media has been used by broadcasters and advertisers to determine viewership information for the digital media. Digital media is also known as Internet-accessible media. Tracking viewership of digital media can present useful information to broadcasters and advertisers when determining placement strategies for digital advertising. The success of advertisement placement strategies is dependent on the accuracy that technology can achieve in generating audience metrics.

BRIEF DESCRIPTION OF THE DRAWINGS

FIGS. 5A-5C include example programming code representative of machine readable instructions that may be executed to implement the example audience metrics generator of FIGS. 1-3 to estimate census-level impression count data and census-level unique audience size data across multiple demographics from subscriber impression count data and subscriber unique audience size data for the multiple demographics in accordance with teachings of this disclosure.

Figure 1:
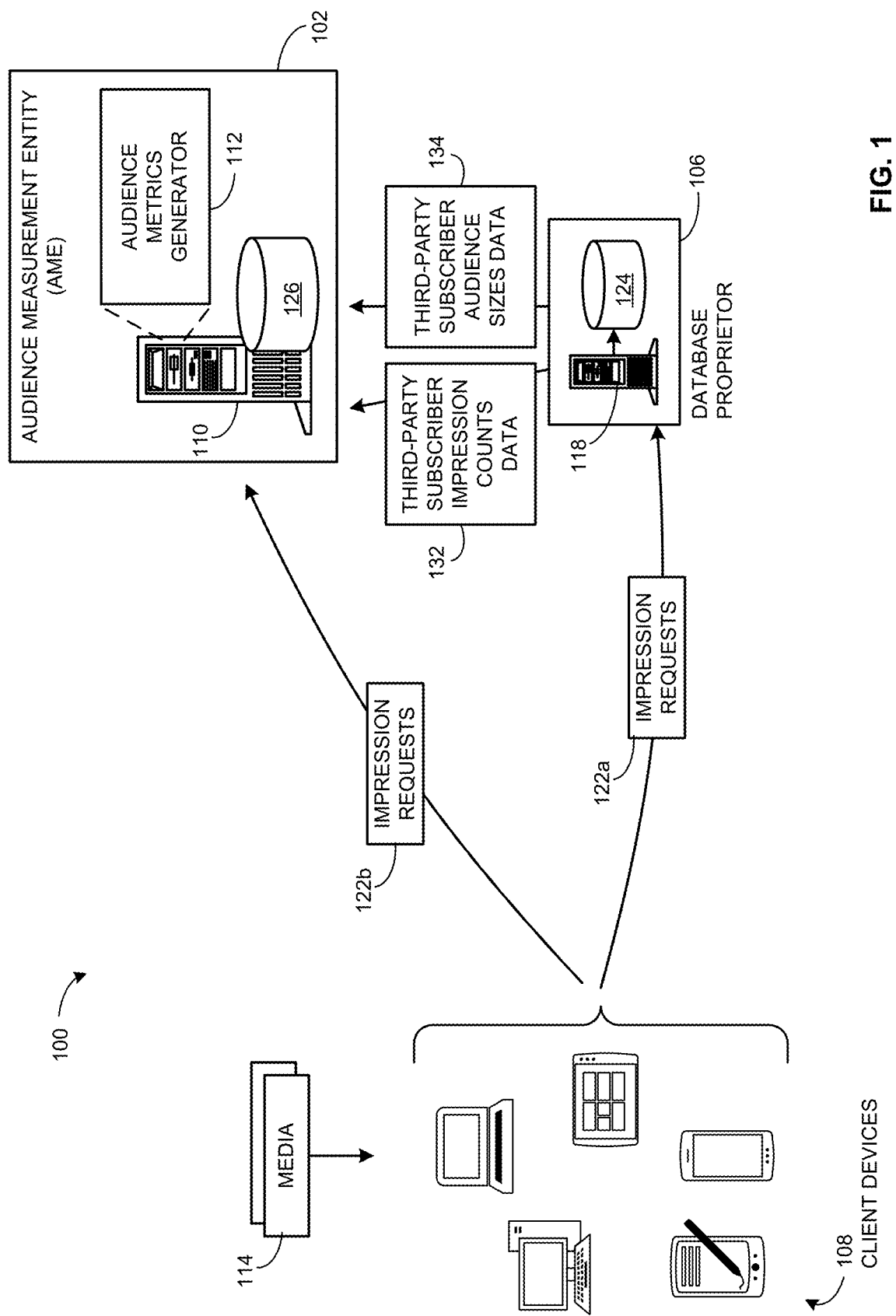
FIG. 1 is an example system for logging impressions of media accessed via client devices.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions (also known as a media impression request) are associated with the hypertext markup language (HTML) of the media to be tracked. When a client requests the media, both the media and the impression request are downloaded to the client. The impression requests are, thus, executed whenever the media is accessed, be it from a server or from a cache.

Impression requests cause monitoring data reflecting information about an access to the media to be sent from the client that downloaded the media to a monitoring entity via a cookie. Sending the monitoring data from the client to the monitoring entity is known as an impression request. Typically, the monitoring entity is an audience measurement entity (AME) that did not provide the media to the client and who is a trusted (e.g., neutral) third party for providing accurate usage statistics (e.g., The Nielsen Company, LLC).

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietor to recognize their subscribers when they visit their web site.

The protocols of the Internet make cookies inaccessible outside of the domain (e.g., Internet domain, domain name, etc.) on which they were set. Thus, a cookie set in, for example, the facebook.com domain is accessible to servers in the facebook.com domain, but not to servers outside that domain. Therefore, although an AME might find it advantageous to access the cookies set by the database proprietors, they are unable to do so.

The inventions disclosed in Mainak et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mainak et al. accomplish this task by structuring the AME to respond to impression requests from clients (who may not be a member of an audience member panel and, thus, may be unknown to the audience member entity) by redirecting the clients from the AME to a database proprietor, such as a social network site partnered with the audience member entity, using an impression response. Such a redirection initiates a communication session between the client accessing the tagged media and the database proprietor. For example, the impression response received from the AME may cause the client to send a second impression request to the database proprietor. In response to receiving this impression request, the database proprietor (e.g., Facebook) can access any cookie it has set on the client to thereby identify the client based on the internal records of the database proprietor. In the event the client corresponds to a subscriber of the database proprietor, the database proprietor logs/records a database proprietor demographic impression in association with the client/user.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by audience members (e.g., the number of times the media is accessed) in, for example, a web population. In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a census measurement science (CMS) tag executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals.

As used herein, a unique audience is based on audience members distinguishable from one another. That is, a particular audience member exposed to particular media is measured as a single unique audience member regardless of how many times that audience member is exposed to that particular media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

Examples disclosed herein estimate total unique audience sizes and impression counts of a universe audience for media based on census-level audience metrics information collected by an AME that includes census-level impression counts but does not include unique total audience sizes nor how the census-level impression counts and audience sizes are distributed across demographics. As used herein, a universe audience (also referred to as a total audience) for media is a total number of unique persons that accessed the media in a particular geographic scope of interest for audience metrics, via one or more websites/webpages, via one or more internet domains, and/or during a duration of interest for the audience metrics. Example geographic scopes of interest could be a city, a metropolitan area, a state, a country, etc. As used herein, a census-level impression (e.g., a census impression) is an impression that is logged for an access to media by a user for which demographic information is unknown. Thus, a census-level impression is indicative of an access to media but not indicative of the audience member to which the access should be attributed. As such, census-level impressions are logged as anonymous accesses to media by an AME to generate impression counts for media. Since the census-level impressions are anonymous, they are not directly indicative of total unique audience sizes because multiple census-level impression counts may be attributed to the same person (e.g., the same person visits the same website multiple times and/or visits multiple different websites that present the same advertisement, and each presentation of that advertisement is reported as a separate impression, albeit for the same person). To overcome the anonymous nature of census-level impressions when estimating total unique audience sizes for media, examples disclosed herein leverage third-party subscriber-level audience metrics information that provides partial information on impression counts and unique audience sizes. For example, a database proprietor may collect third-party subscriber-level audience metrics information based on media accesses by subscribers of services provided by the database proprietors. Since the database proprietors store user information about their subscribers, the database proprietors can log demographic impressions that associate user demographics of subscribers with logged impressions of media accessed by those subscribers. In this manner, the database proprietor generates the third-party subscriber-level audience metrics.

The AME may enter into an agreement or partnership with one or more database subscribers to obtain access to demographic impression data from the database subscriber(s). However, to protect PII of their subscribers, database proprietors generalize their subscriber-level audience metrics information to aggregate data (e.g., third-party aggregate subscriber-based audience metrics information) by generating impression counts and unique audience sizes per demographic category (e.g., females 13-18, males 13-18, females 19-23, males 19-23, etc.). Examples disclosed herein use that third-party aggregate subscriber-based audience metrics information to estimate individual demographic-level impression counts and unique audience sizes for the AME-collected census impressions. Prior techniques for determining total census-level impression counts and/or census-level audience sizes involve using scaling factors, adjustment factors, and/or duplication factors. However, such factors need to be regularly updated, and special criteria need to be applied when estimates exceed a universe estimate.

In the context of generating digital advertising ratings (e.g., using media tagging techniques such as embedding beacon instructions in internet-accessible media) known accurate information can be collected about the number of times a particular advertisement was accessed (e.g., an impression count). However, the audience information on how that audience is distributed across multiple demographics, and in what frequency of media accesses are unknown. Beacon instructions embedded in media cause a browser to report impressions by sending cookies to a third-party database proprietor that double-blind matches the cookies with its database of subscriber information. In this manner, the third-party database proprietor logs demographic impressions associating demographics from subscriber accounts or profiles corresponding to the received cookies of the browser-reported impressions. As not everyone may be a subscriber of the third-party database proprietor, all of the impressions pertaining to a non-subscriber are lost or unusable by the database proprietor to generate demographic impressions. Additionally, only a partial set of impressions may be collected for known users due to possibly those users deleting their cookies in their browsers or due to using public computers in which cookies are disabled or are set in browsers without definitive corresponding users. What is returned is an aggregate summary statistic of how many people in each demographic the third-party database proprietor measured, and how many of their impressions those people accounted for from the total which includes unknown audience members. Table 1 below is a summary representation of incomplete audience metrics data for which examples disclosed herein can determine census-level impression counts and/or census-level audience size across multiple demographic groups.

TABLE 1

| Demo | Population | Third-Party Impressions | Third-Party Audience | Census Impressions | Census Audience |
|---|---|---|---|---|---|
| <18 | 55,000 | 4,140 | 3,113 | $T_1$ | $X_1$ |
| 18-34 | 477,000 | 23,000 | 14,323 | $T_2$ | $X_2$ |
| 35-44 | 312,000 | 13,800 | 10,324 | $T_3$ | $X_3$ |
| 55+ | 156,000 | 5,060 | 4,400 | $T_4$ | $X_4$ |
| Total | 1,000,000 | 46,000 | 32,160 | 100,000 | ??? |

In example Table 1, there are a total of 100,000 census impressions logged for an advertisement across a population in some unknown distribution of demographic-based audience sizes and demographic-based impression counts. As shown in Table 1 above, although the total census impression count is known, the number of audience members (e.g., audience size) (X) in each demographic group and the impression count (T) for each demographic group are unknown. In Table 1, the third-party database proprietor was able to account for 46,000 total impressions and a total of 32,160 unique audience members (e.g., audience size) that accessed the advertisement. Additionally, the third-party database proprietor provided a demographic break-down of how those 46,000 impressions and 32,160 unique audience members were distributed across multiple demographic groups (e.g., ages <18, ages 18-34, ages 35-44, and ages 55+). As demographics are assumed to be mutually exclusive, the respective rows of Table 1 added together equal the totals. Examples disclosed herein estimate demographic distributions of census impression counts ($T_k$) and audience sizes ($X_k$) corresponding to unknown audience members in a way such that the distribution of demographic impression counts ($T_k$) account for the total census impression counts (T) (e.g., $\Sigma_{k=1}^{K} T_k = T$). The estimated demographic distributions determined using examples disclosed herein also follow logical constraints of the underlying given information (e.g., sum of demographic impression counts does not exceed given total census impressions). Although examples disclosed herein are described with impressions of media, examples disclosed herein may be similarly used to measure visits to a store, views on a video, items of wine purchased, etc. as long as it is a counting variable and the third-party information is partial information of those counts among the same people in the collected census information. In examples disclosed herein, estimates of impression counts and audience sizes are determined across categorical groups of demographics. However, the partitioning across categorical groups can be any mutually exclusive categories, not necessarily demographics. Such categorical groups could be different geographic regions, different age/gender demographics, income brackets, etc. The key assumption is that the categories are mutually exclusive, and that each person belongs to one and only one of the category partitions.

Table 1 above in variable notation form is written as shown in Table 2 below.

TABLE 2

| Demo | Population | Third-Party | | Census | |
|---|---|---|---|---|---|
| | | Impressions | Audience | Impressions | Audience |
| 1 | $U_1$ | $R_1$ | $A_1$ | $T_1$ | $X_1$ |
| 2 | $U_2$ | $R_2$ | $A_2$ | $T_2$ | $X_2$ |
| 3 | $U_3$ | $R_3$ | $A_3$ | $T_3$ | $X_3$ |
| 4 | $U_4$ | $R_4$ | $A_4$ | $T_4$ | $X_4$ |
| Total | U | R | A | T | X |

In Table 2 above, $R_k$ represents the recorded impression counts from the third-party database proprietor for the $k^{th}$ demographic, $A_k$ represents the recorded audience sizes from the third-party database proprietor for the $k^{th}$ demographic, $T_k$ represents the census impression counts for the $k^{th}$ demographic, $X_k$ represents the census audience sizes for the $k^{th}$ demographic, and $U_k$ represents the universe estimate for the $k^{th}$ demographic. The universe estimate (U) is the estimated number of people (population) that are able to access an item of media regardless of whether they did or did not access the monitored media. People in the universe estimate could potentially be part of a unique audience size (A, X) if they access the media. The non-subscribed variables are the totals across the demographics. For example, the variable T would be defined as $T = \Sigma_{k=1}^{K} T_k$ and likewise for the other variables. For a single demographic campaign, the totals reduce to those values of the respective variables of that single demographic.

The variable notation shown in Table 2 above was chosen for examples disclosed herein over others to avoid superscripts and subscripts. There are two types of audience variables, one from the third-party database proprietor and the other from census-based metrics data that could be collected by an entity separate from the third-party database proprietor such as an audience measurement entity (AME). In other examples, the third-party database proprietor information could be defined as $A_k^{(0)}$ and the census information could be defined as $A_k^{(1)}$. However, treating them as visually distinct variables of $A_k$ and $X_k$ increases clarity of what is third-party database proprietor information and what is census-based information.

Examples disclosed herein show how to solve for any combination of unknowns across Table 2 above, subject to any linear constraints, and following all logical consequences of the problem. Examples disclosed herein pertain to when only the collection of census impression counts ($T_k$) and census audience sizes ($X_k$) are unknown and the total census impression counts of T is known. In examples disclosed herein, the census impression counts ($T_k$) and the census audience sizes ($X_k$) are all solved simultaneously.

In prior techniques, there is some assumed parametric model for the true census distribution of impression counts, such as the Negative Binomial or a modification thereof. In prior techniques, a loss mechanism model is incorporated, such as a Beta-Binomial mechanism, in which some or all of the true census impressions are lost and what remains is what is recorded in the database. Maximum Likelihood estimation would then be used in the prior techniques to model the parameters of the Negative Binomial and Beta-Binomial parameters, such that the estimate of the census distribution can be known.

With multiple demographic groups, the parameters of the census distribution model may have to vary from demographic to demographic. For example, if there were two parameters for each demographic group and there were ten demographic groups, there would be twenty different parameters that would have to be fixed. Likewise, the loss-mechanism may vary from demographic to demographic. As more demographic groups are added, there are more parameters that must be estimated, which may be computationally or practically impossible to implement using prior techniques.

Examples disclosed herein overcome computation challenges, inaccuracies, and/or logical inconsistencies of prior techniques. Examples disclosed herein do not need to a priori assume any census distribution or loss mechanism, or any parametric model. Examples disclosed herein use information provided in Table 1 above, namely aggregate third-party database proprietor information of audience sizes and impression counts. In examples disclosed herein, the audience sizes and impression counts are based on impressions of media attributable to subscribers of a database proprietor.

The methodology of examples disclosed herein is an applied application of Information Theory, and a general case of Maximum Entropy and Kullback-Leibler Divergence. Using this methodology significantly simplifies the final solution estimates without needing parameter estimates of assumed demographic distributions. An added benefit is that only one parameter needs to be solved independent of the number of demographic groups.

The origin of Information Theory is based on the Shannon Entropy formula for a probability distribution. The Shannon Entropy formula was developed in 1948 and is a measure of missing information—the expected number of bits needed to fully describe a particular outcome from that distribution. The Shannon Entropy on a discrete probability distribution is defined in Equation 1 below in which the logarithm can be any base but is usually defined in base 2 for units of bits, or base e for units of nats.

$$H(P) = -\sum_{i=1}^{n} p_i \log(p_i)$$ (Equation 1)

The properties are independent of the base of the logarithm, as it is a multiplication factor. (Analogous to measuring something as 12 inches or 1 foot, the physical object is the same.) While most applied applications use base 2, most theoretical applications use base e as it makes the mathematical notation easier. Shannon Entropy achieves the maximum value under the uniform distribution when $$p_i = \frac{1}{n}.$$

In 1958 Jaynes described his Principle of Maximum Entropy—of all distributions satisfying a set of linear constraints the one with the highest Shannon Entropy should be chosen. His reasoning was that any other distribution with lower Shannon Entropy is incorporating some additional information which may or may not be true, as it has less missing information. Only the maximum entropy solution incorporates all information that the constraints are specifying without assuming anything more. Jaynes' theory of Maximum Entropy states that if a set of linear constraints the probabilities should satisfy is given, and there could be an infinite number of valid solutions, the distribution which maximizes the Shannon Entropy subject to those constraints should be chosen as the solution. Jaynes' papers show that if a probability distribution with lesser Shannon Entropy than the maximum allowed by the constraints is chosen, then some additional information which may or may not be true is incorporated. Some structure which may not be implied by the state of knowledge given in the statement of the problem is being imposed. Each additional constraint imposed will decrease the missing information, but the goal is to supply that distribution with as much information the constraint provides and no more.

According to Jaynes, the optimization problem shown in Equation 2 below should be solved:

$$\text{maximize } P \quad H = -\sum_{i=1}^{n} p_i \log(p_i)$$ (Equation 2)

$$\text{subject to } \sum_{i=1}^{n} c_{ji} p_i = d_j \quad j = 0, \ldots, m$$

The equality constraints can be expressed in matrix notation as CP=D, where the $j^{th}$ row of C multiplied by column vector of P should equal $d_j$. The zeroth constraint (j=0) is implicit to be the normalization constraint, such that $c_{0i}=1$ for all i. The solution is shown in Equation 3 below.

$$p_i = \exp(-\sum_{j=0}^{m} \lambda_j c_{ji})$$ (Equation 3)

A set of Lagrange multipliers ($\lambda_j$) in Equation 3 above must be determined to satisfy the constraints. In this sense the set of Lagrange multipliers ($\lambda_j$) are functions of the constraint set values ($d_j$). As a corollary, any probability distribution in the log-linear form above is also a maximum entropy distribution for some constraint functions and values. If $z_j$ is defined to be $z_j=\exp(-\lambda_j)$, the formula reduces slightly and leads to the results shown in Equations 4 below, which simplifies the mathematics later on in examples disclosed herein.

$$H_{max}(P) = \sum_{j=0}^{m} d_j \lambda_j$$ (Equation 4)

$$= -\sum_{j=0}^{m} d_j \log(z_j)$$

As shown in Equation 4 above, there is a slight trade-off. In $\lambda$ notation, the probabilities are exponents of a linear combination which may be cumbersome to work with, but the maximum entropy is a linear sum, whereas in z notation the probabilities are products and the maximum entropy is a sum which includes logarithms. If the structure of matrix C has suitable properties in which geometric series sums can be used, then z notation may be easier to work with.

Kullback and Leibler generalized Shannon's paper to incorporate background information, or a known prior distribution different from uniform probability implicit in Shannon's work and Jaynes' Principle of Maximum Entropy. In other words, Jaynes assumed that without any known constraints each probability should be uniform, what Kullback-Leibler did was modify it so that it is a known prior distribution which may differ from the uniform distribution. Their new divergence function is a non-symmetric distance function where the updated distribution is desired to be as close to the prior distribution as possible subject to the new constraints. While Jaynes was maximizing entropy, Kullback and Leibler were minimizing their divergence function. The KL-divergence reduces to Maximum Entropy when the prior distribution is assumed to be uniform. Kullback and Leibler developed their directed divergence which generalized Shannon's entropy in the case in which some background or prior distribution (Q) is known. Equation 5 below is Kullback and Leibler's Principle of Minimum Discrimination Information.

$$D_{KL}(P \| Q) = \sum_{i=1}^{m} p_i \log\left(\frac{p_i}{q_i}\right)$$ (Equation 5)

In Equation 5 above, some background information Q known, the distribution can be updated to a new distribution (P) in such a way that the change is as minimal as possible subject to the new constraints.

Kullback and Leibler's Principle of Minimum Discrimination reduces to Jaynes' Maximum Entropy principle if it is assumed there is no prior knowledge, and therefore the prior distribution is uniform, as shown in Equation 6 below.

$$D_{KL}(P\|U) = \sum_{i=1}^{k} p_i \log\left(\frac{p_i}{\frac{1}{k}}\right) =$$ (Equation 6)

$$\sum_{i=0}^{k} p_i \log p_i - \sum_{i=0}^{k} p_i \log\left(\frac{1}{k}\right) = \log(k) - H(P)$$

As log(k) is constant, minimizing $D_{KL}(P\|U)$ is identical to maximizing H(P). This also illustrates why Shannon Entropy can be considered 'missing information'. From a uniform distribution there is a total of log(k) bits of information, of which $D_{KL}(P\|U)$ is known. Therefore H(P) is what is missing.

In 1971 Guiasu generalized Shannon Entropy to incorporate different weights across the probabilities, and in 1984 Kapur derived the correct analogous solution for weighted Kullback-Leibler divergence.

In 1980 Shore and Johnson proved that the Kullback-Leibler divergence (KL-divergence), and by extension Jaynes' Maximum Entropy Principle, was optimal in the sense that any other function of information, or measures of missingness, would produce inconsistent or illogical results. Only KL-divergence was proved to be a unique function that did not add any unnecessary correlations to the data not assumed by the constraints, that followed the rules of logic, and that produced a unique answer.

In examples disclosed herein, only one variable (e.g., a cross-demographic total census parameter value (c)) needs to be solved independent of the actual number of demographic categories. In addition, total unique audience sizes estimated as disclosed herein are logically consistent with all constraints of an audience estimation problem, and the disclosed procedure is optimal in regards to information theory.

Although examples disclosed herein are described in association with audience metrics related to media impressions and unique audience sizes, examples disclosed herein may be similarly used for other applications to determine population sizes, number of people, number of customers, number of attendees, number of observations in biological matters, etc. The datasets themselves need not be impression counts and/or audience sizes. They could be, for example, related to bank accounts, lists of purchased items, store visits, traffic patterns, biological specimens, etc. The datasets could be represented as lists of numbers or any other information.

FIG. 1 shows an example operating environment 100 that includes an example audience measurement entity (AME) 102, an example database proprietor A 106, and example client devices 108. The example AME 102 includes an example AME computer 110 that implements an example audience metrics generator 112 to estimate total unique audience sizes based on census-level media impressions logged by the AME 102 and based on third-party aggregate subscriber-based audience metrics information provided by the database proprietor 106. In the illustrated example of FIG. 1, the AME computer 110 may also implement an impression monitor system to log media impressions reported by the client devices 108. In the illustrated example of FIG. 1, the client devices 108 may be stationary or portable computers, handheld computing devices, smart phones, Internet appliances, and/or any other type of device that may be connected to the Internet and capable of presenting media.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a media impression is defined as an occurrence of access and/or exposure to media 114 (e.g., an advertisement, a movie, a movie trailer, a song, a web page banner, a webpage, etc.). Examples disclosed herein may be used to monitor for media impressions of any one or more media types (e.g., video, audio, a webpage, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form.

In the illustrated example of FIG. 1, content providers and/or advertisers distribute the media 114 via the Internet to users that access websites and/or online television services (e.g., web-based TV, Internet protocol TV (IPTV), etc.). In some examples, the media 114 is served by media servers of the same internet domains as the database proprietor 106. For example, the database proprietor 106 includes a database proprietor server 118 that can serve media 114 to its corresponding subscribers via the client devices 108. Examples disclosed herein can be used to generate audience metrics data that measures audience sizes of media served by the database proprietor 106 and/or any other entity. For example, the database proprietor 106 may use such audience metrics data to promote its online media serving services (e.g., ad server services, media server services, etc.) to prospective clients. By showing audience metrics data indicative of audience sizes drawn by the database proprietor 106, the database proprietor 106 can sell its media serving services to customers interested in delivering online media to users.

The media 114 is then presented via the client devices 108. When the media 114 is accessed by the client devices 108, the client devices 108 send impression requests 122a to the database proprietor server 118 to inform the database proprietor server 118 of the media accesses. In this manner, the database proprietor server 118 can log media impressions in impression records of a database proprietor audience metrics database 124. In some examples, the client devices 108 also send impression requests 122c to the AME 102 so that the AME 102 can log census impressions in an AME audience metrics database 126. In the illustrated example of FIG. 1, the database proprietor 106 logs demographic impressions corresponding to accesses by the client devices 108 to the media 114. Demographic impressions are impressions logged in association with demographic information collected by the database proprietor 106 from registered subscribers of its services. Also, in the illustrated example of FIG. 1, the AME computer 110 logs census-level media impressions corresponding to accesses by client devices 108 to media 114. Census-level media impressions (e.g., census impressions) are impressions logged regardless of whether demographic information is known for those logged impressions.

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and episode number. When the media 114 includes advertisements, such advertisements may be content and/or advertisements. The advertisements may be individual, standalone advertisements and/or may be part of one or more ad campaigns. The advertisements of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.).

In some examples, the media 114 of the illustrated example is tagged or encoded to include monitoring or tag instructions, which are computer executable monitoring instructions (e.g., Java, java script, or any other computer language or script) that are executed by web browsers that access the media 114 via, for example, the Internet. Execution of the monitoring instructions causes the web browser to send the impression requests 122a,b (e.g., also referred to as tag requests) to one or more specified servers of the AME 102 and/or the database proprietor 106. As used herein, tag requests 122a,b are used by the client devices 108 to report occurrences of media impressions caused by the client devices accessing the media 114. In the illustrated example, the tag requests 122a include user-identifying information that the database proprietor 106 can use to identify the subscriber that accessed the media 114. For example, when a subscriber of the database proprietor 106 logs into a server of the database proprietor 106 via a client device 108, that server of the database proprietor 106 sets a database proprietor cookie on the client device 108 and maps that cookie to the subscriber's identity/account information at the database proprietor server 118. In examples disclosed herein, subscriber identity and/or subscriber account information includes personally identifiable information (PII) such as full name, street address, residence city and state, telephone numbers, email addresses, ages, dates of birth, social security numbers, demographic information, and/or any other person information provided by subscribers in exchange for services from the database proprietor 106. By having such PII information mapped to database proprietor cookies, the database proprietor 106 can subsequently identify the subscriber based on the database proprietor cookie to determine when that user accessed different media 114 and to log an impression in association with demographics and/or other PII information of that user. In the illustrated example of FIG. 1, the impression requests 122a include database proprietor cookies of the client devices 108 to inform the database proprietor 106 of the particular subscribers that accessed the media 114. In some examples, the AME 102 also sets AME cookies in the client devices 108 to identify users that are enrolled in a panel of the AME 102 such that the AME 102 collects PII information of people that enroll in the panel by agreeing to having their internet activities monitored by the AME 102.

The tag requests 122a,b may be implemented using HTTP requests. However, whereas HTTP requests are network communications that traditionally identify web pages or other resources to be downloaded, the tag requests 122a,b of the illustrated example are network communications that include audience measurement information (e.g., ad campaign identification, content identifier, and/or user identification information) as their payloads. The server (e.g., the AME computer 110 and/or the database proprietor server 118) to which the tag requests 122a,b are directed is programmed to log occurrences of impressions reported by the tag requests 122a,b. Further examples of monitoring instructions (e.g., beacon instructions) and uses thereof to collect impression data are disclosed in U.S. Pat. No. 8,370,489 entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), an app publisher (e.g., an app store) can provide a data collector in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and causes the client device 108 to send one or more of the impression requests 122a,b to report the access to the media 114. In such examples, the data collector can obtain user identifiers and/or device identifiers stored in the client devices 108 and send them in the impression requests 122a,b to enable the database proprietor 106 and/or the AME 102 to log impressions. Further examples of using a collector in client devices to collect impression data are disclosed in U.S. Pat. No. 8,930,701 entitled "Methods and Apparatus to Collect Distributed User Information for Media Impressions and Search Terms," and in U.S. Pat. No. 9,237,138 entitled "Methods and Apparatus to Collect Distributed User Information for Media Impressions and Search Terms," both of which are hereby incorporated herein by reference in their entireties.

In the illustrated example, the database proprietor 106 collaborates with the AME 102 so that the AME 102 can operate as an independent party that measures and/or verifies audience measurement information pertaining to the media 114 accessed by the subscribers of the database proprietor 106. However, the database proprietor 106 does so while protecting the privacies of its subscribers by not sharing or revealing subscriber identities, subscriber information, and/or any other subscriber PII information to outside parties. In examples disclosed herein, to share impression data with the AME 102 without revealing subscriber identities, subscriber information, and/or any other subscriber PII information, the database proprietor 106 processes its collected subscriber-level audience metrics information to generate third-party aggregate subscriber-based audience metrics information. In the example of FIG. 1, third-party aggregate subscriber-based audience metrics information is shown as example third-party subscriber impression counts data 132 and example third-party subscriber audience sizes data 134. The example third-party subscriber impression counts data 132 includes impression counts in the aggregate (e.g., no user-identifying PII data) per demographic category for one or more media items of interest. The example third-party subscriber audience sizes data 134 includes unique audience sizes in the aggregate (e.g., no user-identifying PII data) per demographic category for one or more media items of interest.

Figure 2:
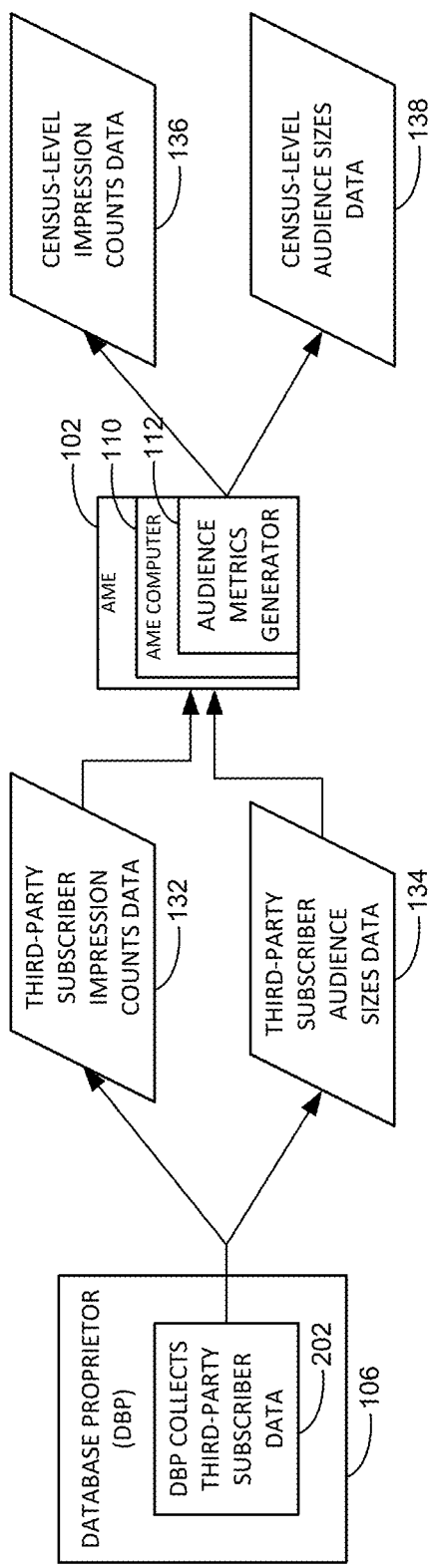
FIG. 2 is a schematic illustration of an example process flow of a database proprietor and an audience measurement entity to estimate census-level impression count data and census-level unique audience size data across multiple demographics based on subscriber impression count data and subscriber unique audience size data for the multiple demographics.

FIG. 2 is an example process flow of the database proprietor 106 and the AME 102 to estimate census-level impression counts and census-level unique audience sizes for media across multiple demographic categories based on the third-party subscriber impression counts data 132 and the third-party subscriber audience sizes data 134. The example process flow of FIG. 2 begins when the database proprietor 106 generates third-party subscriber-level audience metrics data 202 based on logging impressions of the media 114 (FIG. 1) accessed by subscribers of the database proprietor 106. The 106 then anonymizes the subscriber-level audience metrics data 202 by aggregating it by demographic category to generate the third-party subscriber impression counts data 132 and the third-party subscriber audience sizes data 134. In this example, the database proprietor 106 sends the third-party subscriber impression counts data 132 and the third-party subscriber audience sizes data 134 to the example audience metrics generator 112 of the AME 102. The example audience metrics generator 112 utilizes the third-party subscriber impression counts data 132 and the third-party subscriber audience sizes data 134 as inputs estimate census-level impression counts data 136 and census-level audience size data 138.

Figure 3:
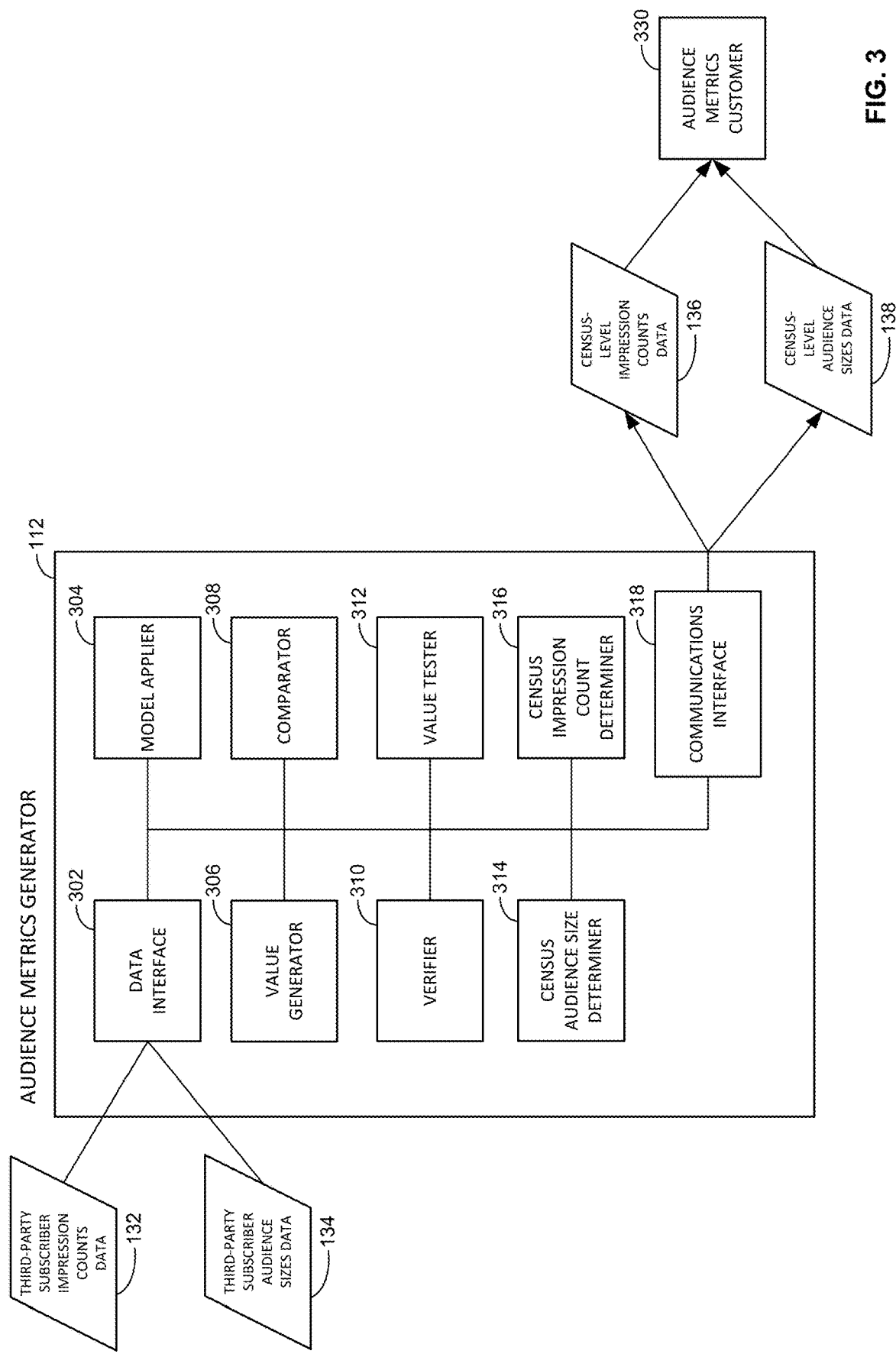
FIG. 3 is a block diagram of the example audience metrics generator of FIGS. 1 and 2 to estimate census-level impression count data and census-level unique audience size data across multiple demographics from subscriber impression count data and subscriber unique audience size data for the multiple demographics in accordance with teachings of this disclosure.

FIG. 3 is a block diagram of the example audience metrics generator 112 of FIGS. 1 and 2 that may be used to estimate the census-level impression counts data 136 and the census-level audience size data 138 of FIG. 2 based on the third-party subscriber impression counts data 132 and the third-party subscriber audience sizes data 134 of FIGS. 1 and 2.

The audience metrics generator 112 is provided with an example data interface 302 to access the third-party subscriber impression counts data 132 and the third-party subscriber audience sizes data 134 (e.g., in memory and/or in one or more network communications). The audience metrics generator 112 is provided with the example model applier 304 to apply an infinite universe audience model or a finite universe audience model. Equations of the infinite universe audience model are a modification to equations of the finite universe audience model discussed below, but the process that the equations complete is the same regardless of which of the infinite universe audience model or the finite universe audience model is used. Some example reasons why the infinite model may be selected include that individual populations of demographic categories are unknown and/or that only demographic proportions of individual demographic populations are known. In addition, the infinite universe audience model may be selected because the values of the third-party subscriber impression counts data 132 and the third-party subscriber audience sizes data 134 is so small, compared to even a lower bound of universe estimate populations, that taking into account a finite population (e.g., a finite universe audience) is unnecessary and may even produce a negligible effect of assuming an infinite population (e.g., an infinite universe audience).

Regardless of which model is selected by the model applier 304, the audience metrics generator 112 is provided with an example value generator 306 to calculate cross-demographic total census parameter values (e.g., a c value) based on impression frequency (f). Impression frequency (f) is determined based on the third-party subscriber impression counts data 132 and the third-party subscriber audience sizes data 134 according to Equation 7 below.

$$f = R/A \quad \text{(Equation 7)}$$

In Equation 7 above, the impression frequency (f) is a number of impressions (R) (e.g., an impression count of the third-party subscriber impression counts data 132) divided by an audience size (A) (e.g., an audience size of the third-party subscriber audience sizes data 134). Equation 7 is logical because impression frequency (f) is defined as the number of impressions (e.g., the impression count) per single person, and the division operation of Equation 7 above transforms the number of impressions per group of people to the smaller number of impressions per individual. This frequency (f) is then used to find the cross-demographic total census parameter values (c). The cross-demographic total census parameter values (c) are calculated using a peak impression frequency value (f*) in Equation 8 below.

$$0 \le c \le \left(\frac{f^*}{f^* - 1}\right) \quad \text{(Equation 8)}$$

In Equation 8 above, the peak impression frequency value (f*) is the highest impression frequency across all demographic categories and, thus, results in the highest values for cross-demographic total census parameter values (c). The example value generator 306 generates a cross-demographic total census parameter value (c) for each demographic category because each demographic category has its own impression count and unique audience size.

The audience metrics generator 112 is provided with an example comparator 308 to compare cross-demographic total census parameter values (c) with one another and select the greatest or peak cross-demographic total census parameter value (C*) as the upper bound of an optimization problem for estimating census-level impression counts per demographic category (e.g., the census-level impression counts data 136) and estimating total unique-audience sizes per demographic category (e.g., the census-level audience sizes data 138). This optimization problem relates to entropy and probability and is further explained below. By performing such comparisons, the example comparator 308 finds a cross-demographic total census parameter value (c) which satisfies all the constraints of the optimization problem. In examples disclosed herein, the constraints also specify that the cross-demographic total census parameter value (c) must be positive and be less than the upper bound defined by the greatest or peak cross-demographic total census parameter value (C*). These two constraints are defined by Equation 9 below.

$$0 \le c \le C^* \quad \text{(Equation 9)}$$

In Equation 9 above, a lower bound constraint is zero, and an upper bound constraint is the cross-demographic total census parameter value (c) that was chosen by the cross-demographic total census parameter value comparator 304 as the greatest or peak cross-demographic total census parameter value (C*). In Equation 9, the example cross-demographic total census parameter value (c) can be any rational number in the range from zero to the upper-bound (e.g., the greatest cross-demographic total census parameter value (C*)).

The audience metrics generator 112 includes an example value tester 312 to select a cross-demographic total census parameter value (c) in the allowable range defined by Equation 9 above. The audience metrics generator 112 is provided with an example census audience size determiner 314 to determine the example census-level audience sizes data 138 based on the third-party subscriber impression counts data 132, the third-party subscriber audience sizes data 134, and the cross-demographic total census parameter value (c) using, for example, Equation 10 below.

$$X_k = \frac{A_k}{1 - R_k\left(\frac{1}{A_k} - \frac{1}{U_k}\right)\left(\frac{c-1}{c}\right)} \quad \text{(Equation 10)}$$

In Equation 10 above, the example census-level audience sizes data 138 ($X_k$) is determined based on the third-party subscriber audience sizes data 134 for the $k^{th}$ demographic category ($A_k$), the third-party subscriber impression counts data 132 for the $k^{th}$ demographic category ($R_k$), the universe estimate for the $k^{th}$ demographic category ($U_k$), and the cross-demographic total census parameter value (c) selected for this iteration. After the census-level audience sizes data 138 ($X_k$) is determined, an example census impression count determiner 316 accesses the selected cross-demographic total census parameter value (c) and the census-level audience sizes data 138 ($X_k$) as inputs.

The audience metrics generator 112 is provided with the example census impression count determiner 316 to determine the census-level impression counts data 136 based on the third-party subscriber impression counts data 132, the third-party subscriber audience sizes data 134, the cross-demographic total census parameter value (c), and the census-level audience sizes data 138 ($X_k$) using, for example, Equation 11 below.

$$T_k = \frac{X_k}{1 - c\left(1 - \frac{A_k}{R_k}\right)} \quad \text{(Equation 11)}$$

In Equation 11 above, the census-level impression counts data 136 ($T_k$) is determined based on the census-level audience sizes data 138 ($X_k$), the third-party subscriber audience sizes data 134 for the $k^{th}$ demographic category ($A_k$), the third-party subscriber impression counts data 132 for the $k^{th}$ demographic category ($R_k$), and the cross-demographic total census parameter value (c) selected for this iteration.

The audience metrics generator 112 is provided with an example verifier 310 to verify that the estimated census-level impression counts data 136 is logically consistent with the census-level total impression count collected by the AME 102. The example verifier 310 uses Equation 12 as shown below.

$$\Sigma_{k=1}^{K} T_k = T \quad \text{(Equation 12)}$$

Equation 12 above is a T-constraint. In Equation 12 above, the census-level total impression count (T) is known based on the census impressions collected by the AME 102. As expressed in Equation 12 above, the example verifier 310 confirms the validity of the individual census-level impression counts ($\Sigma T_k$) for the k demographic categories by determining whether the sum of all the individual census-level impression counts ($\Sigma T_k$) from the first demographic category (k=1) to the last demographic category (K) is equal to the census-level total impression count (T). The example verifier 310 either returns an affirmative response or a negative response. If the example verifier 310 determines that the sum of the individual census-level impression counts ($\Sigma T_k$) for the k demographic categories is equal to the census-level total impression count (T), the verifier 310 generates a response or information to inform the value tester 312 that the previously selected cross-demographic total census parameter value (c) satisfies the constraint of Equation 12 above. Since the previously selected cross-demographic total census parameter value (c) satisfies the constraint of Equation 12 above, the example value tester 322 then does not select a different cross-demographic total census parameter value (c) for testing. Instead, the value tester 322 instructs the data interface 302 to store the census-level audience sizes data 138 and the census-level impression counts data 136 in memory. In addition, the audience metrics generator 112 is provided with an example communications interface 318 to send the census-level audience sizes data 138 and the census-level impression counts data 136 for each demographic category to an example audience metrics customer 330.

If the example verifier 310 determines that the sum of the individual census-level impression counts ($\Sigma T_k$) for the k demographic categories is not equal to the census-level total impression count (T), the verifier 310 generates a response or information to inform the value tester 322 that the previously selected cross-demographic total census parameter value (c) does not satisfy the constraint of Equation 12 above. The value tester 322 selects a different cross-demographic total census parameter value (c) to test. This iteration of testing different cross-demographic total census parameter values (c) may occur in some examples throughout the entire range of allowable cross-demographic total census parameter values (c). Eventually, a cross-demographic total census parameter value (c) will result in satisfying the constraint of Equation 12 above.

While an example manner of implementing the audience metrics generator 112 of FIGS. 1 and 2 is illustrated in FIG. 3, one or more of the elements, processes and/or devices illustrated in FIG. 3 may be combined, divided, re-arranged, omitted, eliminated and/or implemented in any other way. Further, the example data interface 302, the example model applier 304, the example value generator 306, the example comparator 308, the example verifier 310, the example value tester 312, the example census audience size determiner 314, the example census impression count determiner 316, the example communications interface 318 and/or, more generally, the example audience metrics generator 112 of FIG. 3 may be implemented by hardware, software, firmware and/or any combination of hardware, software and/or firmware. Thus, for example, any of the example data interface 302, the example model applier 304, the example value generator 306, the example comparator 308, the example verifier 310, the example value tester 312, the example census audience size determiner 314, the example census impression count determiner 316, the example communications interface 318 and/or, more generally, the example audience metrics generator 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 302, the example model applier 304, the example value generator 306, the example comparator 308, the example verifier 310, the example value tester 312, the example census audience size determiner 314, the example census impression count determiner 316, and/or the example communications interface 318 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience metrics generator 112 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In examples disclosed herein, the census audience size determiner 314 may be used to implement means for determining a census-level audience size. The example census impression count determiner 316 may be used to implement means for determining a census-level impression count. In examples disclosed herein, the verifier 310 may be used to implement means for verifying. In some examples, the value tester 312 implements means for selecting cross-demographic total census parameter values. In some examples, the AME computer 110 implements means for logging impressions (e.g., census-level impressions). In some examples, the database proprietor server 118 implements means for generating subscriber-level audience metrics data.

Figure 4:
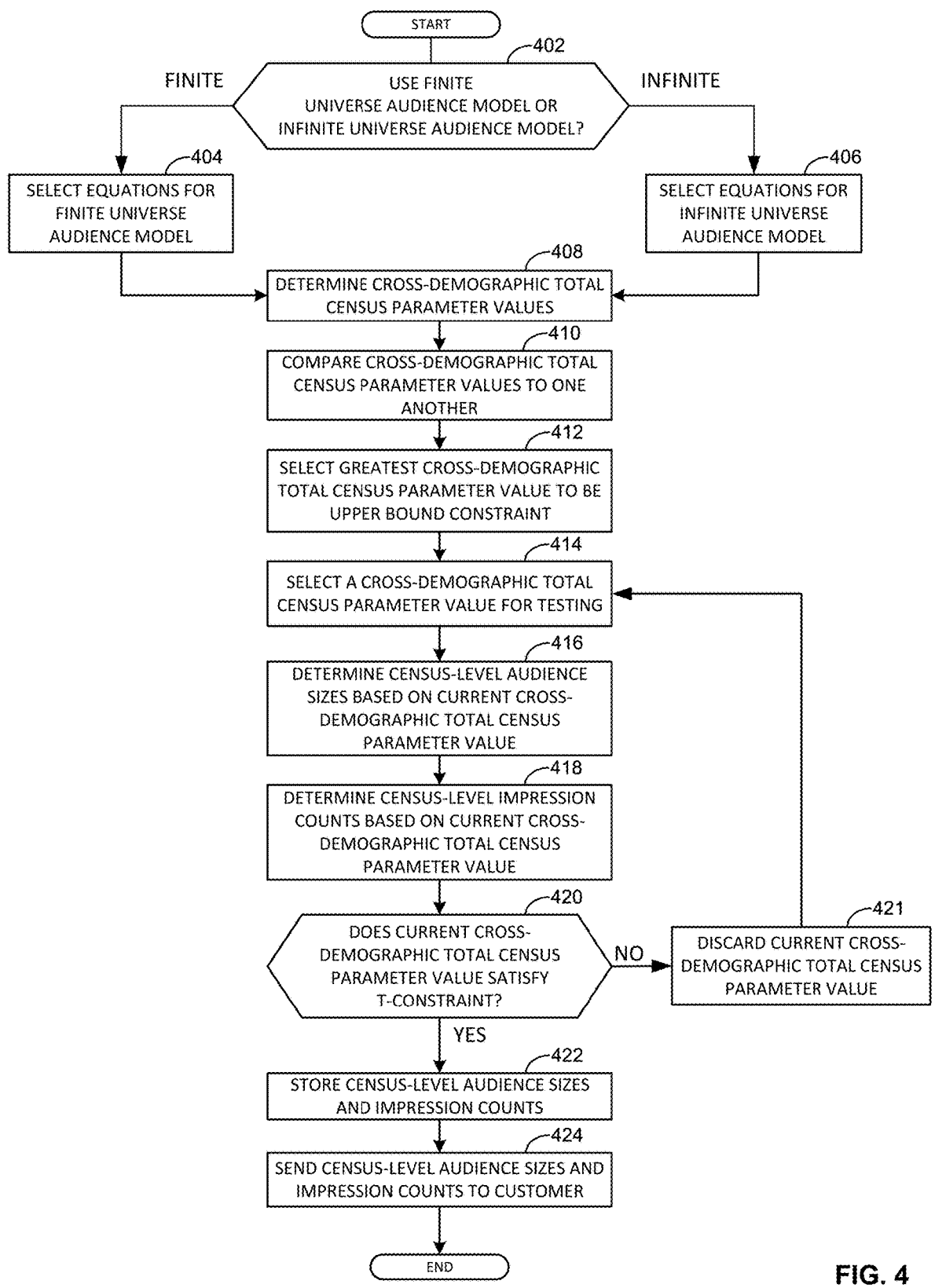
FIG. 4 is a flowchart representative of example machine-readable instructions which may be executed to implement the example audience metrics generator of FIGS. 1-3 to estimate census-level impression counts data and census-level unique audience sizes data across multiple demographics based on subscriber impression count data and subscriber unique audience size data for the multiple demographics in accordance with teachings of this disclosure.

A flowchart representative of example hardware logic, machine readable instructions, hardware implemented state machines, and/or any combination thereof for implementing the audience metrics generator 112 of FIGS. 1-3 is shown in FIG. 4. The machine readable instructions may be one or more executable programs or portion(s) of an executable program for execution by a computer processor such as the processor 612 shown in the example processor platform 600 discussed below in connection with FIG. 6. The program(s) may be embodied in software stored on a non-transitory computer readable storage medium such as a CD-ROM, a floppy disk, a hard drive, a DVD, a Blu-ray disk, or a memory associated with the processor 612, but the entirety of the program(s) and/or parts thereof could alternatively be executed by a device other than the processor 612 and/or embodied in firmware or dedicated hardware. Further, although the example program(s) is/are described with reference to the flowchart illustrated in FIG. 4, many other methods of implementing the example audience metrics generator 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process(es) of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of example machine-readable instructions which may be executed to implement the example audience metrics generator 112 of FIGS. 1-3 to estimate the census-level impression counts data 136 (FIGS. 2 and 3) and the census-level unique audience sizes data 138 (FIGS. 2 and 3) across multiple demographics based on the third-party subscriber impression counts data 132 and the third-party subscriber unique audience sizes data 134 for the multiple demographics. The example program of FIG. 4 begins at block 402 at which the model applier 304 (FIG. 3) determines which model to apply to the third-party subscriber impression counts data 132 and the third-party subscriber audience sizes data 134. If, for example, the model applier 304 determines to use a finite universe audience model, the model applier 304 selects to use Equation 4 and Equation 5 above for the finite universe audience model (block 404). If, for example, the model applier 304 determines to use an infinite universe audience model, the model applier 304 selects to use, Equation 13 and Equation 14 below for the infinite universe audience model (block 406). Equation 13 below has the same function as Equation 10 except that it is based on an infinite universe audience (e.g., U=infinity and $U_k$=infinity).

$$X_k = \frac{A_k^2 c}{R_k - c(R_k - A_k)} \quad \text{(Equation 13)}$$

In Equation 13 above, census-level audience sizes for all demographic categories ($X_k$) of the census-level audience sizes data 138 can be estimated for the infinite universe audience model. Equation 14 is shown below.

$$T_k = \frac{A_k^2 c R_k}{(R_k - c(R_k - A_k))^2} \quad \text{(Equation 14)}$$

In Equation 14 above, census-level impression counts for all demographic categories ($T_k$) of the census-level impression counts data 136 can be estimated for the infinite universe audience model.

At block 408, the value generator 306 (FIG. 3) generates the cross-demographic total census parameter values (c). For example, the value generator 306 determines the cross-demographic total census parameter values (c) based on impression frequency as described above in connection with Equation 2.

At block 410, the comparator 308 compares the cross-demographic total census parameter values (c) to one another. The comparator 308 selects the greatest one of the cross-demographic total census parameter values (c) to be the upper bound constraint (e.g., the greatest cross-demographic total census parameter value (C*)) of Equation 9 above (block 412). The value tester 312 selects one of the cross-demographic total census parameter values (c) to test (block 414). For example, the value tester 312 selects one of the cross-demographic total census parameter values (c) that is in the lower and upper bound range of Equation 9 above for testing on whether it results in estimated census-level impression counts data 136 and census-level audience sizes data 138 for which a sum of census-level impression counts for the demographic categories (k) is equal to a census-level total impression count (T) in accordance with the T-constraint of Equation 6 above.

At block 416, the census audience size determiner 314 (FIG. 3) determines census-level audience sizes for multiple demographic categories ($X_k$) based on the current cross-demographic total census parameter value (c). For example, if the finite universe audience model is selected at block 402, the census audience size determiner 314 uses Equation 10 above to determine the census-level audience sizes based on the third-party subscriber audience sizes data 134 for the $k^{th}$ demographic category ($A_k$), the third-party subscriber impression counts data 132 for the $k^{th}$ demographic category ($R_k$), the universe estimate for the $k^{th}$ demographic category ($U_k$), and the current cross-demographic total census parameter value (c) selected for this iteration. If the infinite universe audience model is selected at block 404, the census audience size determiner 314 uses Equation 13 above to determine the census-level audience sizes based on the third-party subscriber audience sizes data 134 for the $k^{th}$ demographic category ($A_k$), the third-party subscriber impression counts data 132 for the $k^{th}$ demographic category ($R_k$), and the current cross-demographic total census parameter value (c) selected for this iteration. At block 418, the census impression count determiner 316 (FIG. 3) determines census-level impression counts for multiple demographic categories ($T_k$) based on the current cross-demographic total census parameter value (c). For example, if the finite universe audience model is selected at block 402, the census impression count determiner 316 uses Equation 11 above to determine the census-level impression counts based on the census-level audience sizes (e.g., the census-level audience sizes data 138 ($X_k$)), the third-party subscriber audience sizes data 134 for the $k^{th}$ demographic category ($A_k$), the third-party subscriber impression counts data 132 for the $k^{th}$ demographic category ($R_k$), and the current cross-demographic total census parameter value (c) selected for this iteration. If the infinite universe audience model is selected at block 404, the census impression count determiner 316 uses Equation 14 above to determine the census-level impression counts based on the third-party subscriber audience sizes data 134 for the $k^{th}$ demographic category ($A_k$), the third-party subscriber impression counts data 132 for the $k^{th}$ demographic category ($R_k$), and the current cross-demographic total census parameter value (c) selected for this iteration.

At block 420, the example verifier 310 (FIG. 3) determines whether the current cross-demographic total census parameter value (c) satisfies the T-constraint of Equation 12 above. For example, the verifier 310 confirms the validity of the individual census-level impression counts ($\Sigma T_k$) for the k demographic categories (e.g., determined using the current cross-demographic total census parameter value (c)) by determining whether the sum of all the individual census-level impression counts ($\Sigma T_k$) from the first demographic category (k=1) to the last demographic category (K) is equal to the census-level total impression count (T). If the example verifier 310 determines at block 420 that the current cross-demographic total census parameter value (c) does not satisfy the T-constraint of Equation 12 above, the verifier 310 discards the current cross-demographic total census parameter value (c) (block 421), and control returns to block 414 to select another cross-demographic total census parameter value (c) for testing. If the example verifier 310 determines at block 420 that the current cross-demographic total census parameter value (c) satisfies the T-constraint of Equation 6 above, control advances to block 422. At block 422, the example data interface 302 stores the census-level audience sizes data 138 and the census-level impression counts data 136 in memory. At block 424, the example communications interface 318 (FIG. 3) sends the census-level audience sizes data 138 and the census-level impression counts data 136 for the demographic categories (k) to an example audience metrics customer 330. The example instructions of FIG. 4 then end.

The following discussion is provided for the interested reader regarding the development of examples disclosed herein. However, examples disclosed herein are not limited to this manner of development, and use of examples disclosed herein is not dependent on any particular manner of development of such disclosed examples. The development of examples disclosed herein addressed the following three questions: (1) What if both the prior and posterior distributions use the same constraint functions but their constraint values may be different, and the prior itself is a solution to a Maximum entropy distribution? (2) How can actual values of certain constraint values be estimated when they are unknown and treated as symbolic variables? and (3) What is the analytical formula for the KL-divergence assuming both the prior and posterior are on the same domain, same constraint functions, just different constraint values?

For the first question in which both the prior and posterior distributions use the same constraint functions, but their constraint values may be different, and the prior itself is a solution to a Maximum Entropy distribution, Equation 15 below shows what the posterior P would look like when the distribution Q itself is a solution to a Maximum Entropy problem as shown in Equation 16 below.

$$\text{minimize } P \quad D = \sum_{i=1}^{n} p_i \log\left(\frac{p_i}{q_i}\right) \quad \text{(Equation 15)}$$

$$\text{subject to } \sum_{i=1}^{n} c_{ji} p_i = d_j^P \quad j = 0, \ldots, m$$

$$\text{maximize } Q \quad H = -\sum_{i=1}^{n} q_i \log(q_i) \quad \text{(Equation 16)}$$

$$\text{subject to } \sum_{i=1}^{n} c_{ji} q_i = d_j^Q \quad j = 0, \ldots, m$$

In Equations 15 and 16 above, both P and Q have the same constraint matrix C, yet their constraint values may be different. Equations 15 and 16 above show that $CP=D^P$ and $CQ=D^Q$ where the superscripts denote that their values may be different.

The solution to Equations 15 and 16 above can be determined as follows in Equation 17 below for some set of parameters ($\xi_j$).

$$p_i = q_i \exp\left(-\sum_{j=0}^{m} \delta_j c_{ji}\right) = \left[\exp\left(-\sum_{j=0}^{m} \lambda_j c_{ji}\right)\right] \quad \text{(Equation 17)}$$

$$\exp\left(-\sum_{j=0}^{m} \delta_j c_{ji}\right) =$$

$$\exp\left(-\sum_{j=0}^{m} (\lambda_j + \delta_j) c_{ji}\right) = \exp\left(-\sum_{j=0}^{m} \xi_j c_{ji}\right)$$

As the posterior P itself is also in log-linear form, this means that P is also a solution of a Maximum Entropy problem. The posterior P is the same symbolic solution as the prior Q subject to the constraint values. If $D^Q$ or $D^P$ are treated as symbolic variables, D, then both ($\lambda_j$) and ($\xi_j$) are the same functional forms of D. That is, for illustration, if $\lambda_1 = d_1^Q + 3d_2^Q$ for some values of $d_1$ or $d_2$ (either known or symbolic), then $\xi_1 = d_1^P + 3d_2^P$. Both the prior Q and the posterior P are the same functional formulas for a generic set of constraint values. If $\lambda$ (or z representation) is solved for, $\xi$ is automatically obtained and vice versa.

For the second question of how actual values of certain constraint values can be estimated when they are unknown and treated as unknown symbolic variables. To illustrate what this question means, there is a set of s known constraint values the probabilities must satisfy in terms of linear combinations, as shown in Equation 18 below.

$$\Sigma_{i=1}^{n} c_{ji} p_i = d_j \, j=0, \ldots, s \quad \text{(Equation 18)}$$

Once an estimate of the probability distribution is known, the output of additional linear functions is estimated using Equation 19 below.

$$\Sigma_{i=1}^{n} c_{ji} \hat{p}_i = \hat{d}_j \, j=s+1, \ldots, m \quad \text{(Equation 19)}$$

The hat circumflex notation is used for both p and d in the above estimates of Equation 19. In examples disclosed herein, the hat circumflex notation of a variable (e.g., $\hat{p}_i$, $\hat{d}_j$, etc.) is used to represent an estimate or prediction of the variable of interest. An estimate of posterior distribution P is used to estimate the output d of a linear combination of the probability estimates. There are two different ways to look at the problem using Maximum Entropy. The first method involves solving for the probability distribution which maximizes the Shannon entropy of the s original constraints as shown in Equation 20 below.

$$\text{maximize } P \quad H = -\sum_{i=1}^{n} p_i \log(p_i) \quad \text{(Equation 20)}$$

$$\text{subject to } \sum_{i=1}^{n} c_{ji} p_i = d_j \quad j = 0, \ldots, s$$

Equation 20 solves for the estimate of the probabilities using Maximum Entropy subject to the constraints of Equation 18. Then, knowing the Maximum Entropy solution, $\hat{P}$, those probabilities are directly substituted into the remaining linear combinations to unknown values of d, represented by $\hat{d}_j$, as shown in Equation 21 below.

$$\Sigma_{i=1}^{n} c_{ji} \hat{p}_i = \hat{d}_j \, j=s+1, \ldots, m \quad \text{(Equation 21)}$$

This produces an estimate of values wanted (e.g., $\hat{d}_j$). For example, if $d_{10}=p_1+p_2$ but the values of $p_1$ and $p_2$ are unknown, $d_{10}$ is also unknown. However, if estimates of $p_1$ and $p_2$ are known (e.g., $\hat{p}_1=0.1$ and $\hat{p}_2=0.2$), the estimate of $d_{10}$ is $\hat{d}_{10}=0.3$. The probability distribution uses the full knowledge and information of the first s constraints and introduces no other correlations or additional assumptions other than those imposed by those constraints s. In some examples, probabilities are the best unbiased estimates in the case of the s known constraints. Those estimated probabilities are then used to predict the remaining unknown values needed to be estimated. In some cases, the above numerical procedure is the foremost suitable for particular data, but in other cases a more general procedure is applicable.

The second method of looking at the problem using Maximum Entropy is to combine all constraints, known or unknown, into one constraint matrix C and values D. In the above, the first constraints s are known numerically and the remaining are unknown. In Equation 22 below, the remaining values are treated as variables.

$$\text{maximize } P \quad H = -\sum_{i=1}^{n} p_i \log(p_i) \quad \text{(Equation 22)}$$

$$\text{subject to } \sum_{i=1}^{n} c_{ji} p_i = d_j \quad j = 0, \ldots, m$$

The solution, as detailed above, is shown in Equation 23 below.

$$p_i = \exp(-\Sigma_{j=0}^{m} \lambda_j c_{ji}) \quad \text{(Equation 23)}$$

where the set $(\lambda_j)$ is determined to satisfy the constraints. The maximum value of entropy is given as shown below in Equation 24.

$$H_{max}(P) = \sum_{j=0}^{m} d_j \lambda_j = -\sum_{j=0}^{m} d_j \log(z_j) \quad \text{(Equation 24)}$$

As the set $(\lambda_j)$, or equivalently $(z_j)$, are functions of the constraint set values $(d_j)$ the maximum entropy is also a function of $(d_j)$. If the first constraints m are known numerically, their values are substituted to those functional forms, with the remaining being unknown values and kept as variables. For simplicity assume only one unknown value $d_m$ is unknown. $H_{max}(P)$ would be a function of $d_m$. Only one numerical value of $d_m$ is consistent with the probabilities of knowing just the first m−1 constraints. This is the same as the first method described above in connection with Equations 20 and 21. Any deviation from that value, $\hat{d}_m$, imparts additional restrictions of the probabilities not given by the previous m−1 constraints. As such, some missing information is given, and the maximum entropy solution is reduced. To maximize the entropy, the $\hat{d}_m$ which makes $H_{max}(P)$ (as a function of $d_m$) as large as possible is found. In other words, $\hat{d}_m$ is the solution to Equation 25 below.

$$\left.\frac{\partial}{\partial d_m}\right|_{d_m=\hat{d}_m} H(P) = 0 \quad \text{(Equation 25)}$$

The same argument can be made for two unknown values, $d_1$ and $d_2$, where it is now a system of equations which is evaluated as shown in Equation 26 below.

$$\frac{\partial H(P)}{\partial d_1} = 0 \quad \text{(Equation 26)}$$

$$\frac{\partial H(P)}{\partial d_2} = 0$$

The full set of m constraint values can be symbolic, where H(P) is now a function of all m variables. If the first s original constraints are known, those values can be substituted into the entropy function, and then $(\hat{d}_m)$ for j=(s, s+1, ... m) is solved for such as in Equation 27 below.

$$\frac{\partial H(P)}{\partial d_j} = 0 \quad \forall\ j = (s, s+1, \ldots, m) \quad \text{(Equation 27)}$$

The advantage of this second method is when symbolic representation of $(\lambda j)$, or equivalently $(zj)$, are known for all constraint functions (known or unknown), a closed form expression for the optimal unknown values may be solved. With similar arguments, the above can be extended to unknown constraints with KL directed divergence, or even among both P and Q values. If both P and Q share the same domain and the same constraint functions, and if the solution to $(\lambda j)$ can be solved analytically for arbitrary D variables, an analytical expression for ends to the KL-divergence for any combination of knowns or unknowns can be determined. This leads to the third question.

Now turning to the third question, it pertains to determining the analytical formula for the KL-divergence assuming both the prior and posterior are on the same domain, same constraint functions, but just different constraint values.

$$\begin{aligned}
KL(P:Q) &= \sum_{i=1}^{n} p_i \log\left(\frac{p_i}{q_i}\right) \quad \text{(Equation 28)} \\
&= \sum_{i=1}^{n} p_i \log(p_i) - \sum_{i=1}^{n} p_i \log(q_i) \\
&= -H(P) - \sum_{i=1}^{n} p_i \left(-\sum_{j=0}^{m} \lambda_j^Q c_{ji}\right) \\
&= -H(P) + \sum_{j=0}^{m} \lambda_j^Q \sum_{i=1}^{n} p_i c_{ji} \\
&= -\sum_{j=0}^{m} \lambda_j^P d_j^P + \sum_{j=0}^{m} \lambda_j^Q d_j^P \\
&= \sum_{j=0}^{m} (\lambda^Q - \lambda^P) d_j^P \\
&= \sum_{j=0}^{m} d_j^P \log\left(\frac{z_j^P}{z_j^Q}\right)
\end{aligned}$$

In Equation 28 above, The KL-divergence from a sum across n probabilities (which could have n→∞) has been expressed to a finite sum of the m constraint values. If an analytical form exists for $(\lambda_j)$, or equivalently $(z_j)$, all variables within the KL expression can be substituted by one of the two last expressions depending on whether λ or z notation is used. Example Equation 28 above can be used as a basis for estimating the census-level impression counts data 136 and the census-level audience sizes data 138 of FIGS. 2 and 3.

The above three questions were used to develop the application of information theory to determining the demographic-level impression counts and audience sizes for census data. Based on examples disclosed herein, if a Maximum Entropy problem for the general case with all symbolic variables can be solved for, then the KL(P:Q) representation directly relating both distribution of prior and posterior can be written, and the unknown values can be solved for by solving a minimization problem. The above discussion related to the three questions pertains to unconstrained problems, where the derivative is zero. However, later a constraint of known totals is included.

An example of determining a KL-divergence between a prior and a posterior is described below in connection with Equations 29-33 below. In this example, it is assumed that there are only two constraints, outside of the natural constraint of the total being 100% ($d_0=1$), with the other two symbolic variables (e.g., $d_1$ and $d_2$ shown in Equation 29 below) which could be substituted for numerical values, if known.

$$CP\begin{bmatrix}1\\d_1\\d_2\end{bmatrix}$$ (Equation 29)

With the understood constraint that $d_0=1$ and the first row of matrix C is all ones, detailing the sum of the probabilities is 100%. Superscripts Q and P are used if the values are from the prior (Q) or posterior (P). The actual structure of C is not necessary to be given in this example. The general solution to the probabilities is given in Equation 30 below.

$$p_i = \Pi_{j=0}^{m} z_j^{c_{ji}}$$ (Equation 30)

Assume for this example that the set ($z_j$) which solves for all the constraints are in the below example Equation 31.

$$z_0 = d_2$$

$$z_1 = d_1 + d_2$$

$$z_2 = 1 + d_1$$ (Equation 31)

The values of the set ($z_j$) are functions of the constraint values, either known numerically or unknown as symbolic variables. The KL-divergence between the prior and posterior is the following, with $d_0=1$ stated directly in Equation 32 below.

$$KL(P:Q) = $$ (Equation 32)
$$(1)\log\left(\frac{d_2^P}{d_2^Q}\right) + \ldots + (d_1^P)\log\left(\frac{d_1^P + d_2^P}{d_1^Q + d_2^Q}\right) + \ldots + (d_2^P)\log\left(\frac{1+d_1^P}{1+d_1^Q}\right)$$

The above Equation 32 describes the relationships between any set of known or unknown variables across the prior or posterior. Assume that the value of $d_2^P$ is unknown, but all other variables are known numerical values. The term $\hat{d}_2^P$ is found to be the solution to Equation 33 below.

$$\frac{\partial}{\partial d_2^P}\bigg|_{d_2^P = \hat{d}_2^P} KL(P:Q) = 0$$ (Equation 33)

If multiple variables are unknown, even across the prior or posterior values, simultaneous equation solving can be done.

The principles from the above discussion concerning the three questions addressed in developing examples disclosed herein may be used in configuring computer to apply information theory in accordance with examples disclosed herein to estimate census-level impression counts and census-level audience sizes. In a universe of audience members, although each person in reality would have a fixed but unknown number of impressions, both in census data and in the third-party database proprietor data (e.g., 'John Smith' had 5 impressions of which only 2 were logged in a database), the aggregate information of the third-party database proprietor obfuscates the person-specific data of subscribers of the database, resulting in known aggregates among the individuals within a demographic.

For the aggregate information form the third-party database proprietor, the uncertainty for each person is expressed as a probability distribution. For example, assume the entire Universe (U) consists of five individuals. That uncertainty can be detailed with a collection of five probability distributions going across the possibility of each individual seeing zero, one, two, etc. impressions.

$$p_0^{(1)} \quad p_1^{(1)} \quad p_2^{(1)} \quad \ldots \quad \leftarrow [\text{Person 1}]$$
$$p_0^{(2)} \quad p_1^{(2)} \quad p_2^{(2)} \quad \ldots$$
$$p_0^{(3)} \quad p_1^{(3)} \quad p_2^{(3)} \quad \ldots$$
$$p_0^{(4)} \quad p_1^{(4)} \quad p_2^{(4)} \quad \ldots$$
$$p_0^{(5)} \quad p_1^{(5)} \quad p_2^{(5)} \quad \ldots \quad \leftarrow [\text{Person 5}]$$

Where $p_j^{(i)}$ is the probability the $i^{th}$ person saw j impressions. For each person, the sum of probabilities they either saw no impression, one, two, etc. is one (e.g., $\Sigma_{j=0}^{\infty} p_j^{(i)} = 1$), and all probabilities must be accounted for across the mutually exclusive and exhaustive combinations.

In the example below, a demographic label is added to each person to categorize the person into a demographic group.

$$\left.\begin{array}{cccc}p_0^{(1)} & p_1^{(1)} & \ldots & p_n^{(1)}\\p_0^{(2)} & p_1^{(2)} & \ldots & p_n^{(2)}\end{array}\right\}\text{Demo 1}$$

$$\left.\begin{array}{cccc}p_0^{(3)} & p_1^{(3)} & \ldots & p_n^{(3)}\\p_0^{(4)} & p_1^{(4)} & \ldots & p_n^{(4)}\\p_0^{(5)} & p_1^{(5)} & \ldots & p_n^{(5)}\end{array}\right\}\text{Demo 2}$$

Without any knowledge of demographic information, either in audiences or impressions, adding a demographic label does not impact the probability distribution. Person 1 could be assigned the label 'Male', or a different label of 'New York'. Neither impacts the probability distribution itself. However, knowledge of demographic-specific information does impact the distribution.

Consider the case of the $i^{th}$ demographic consisting of $n^{(i)}$ individuals. If there is no knowledge of individual behavior, but known total behavior, every individual within that demographic must be assigned the same probability distribution. For example, there are 100 audience members and 300 total impressions, each person has an average of three impressions. The available information of the problem above includes both audience size and impression counts. Distribution of the audience size and impression count information across the individuals within a demographic yields a person-specific distribution. In other words, an estimate of the distribution for any individual within the population subject to some value of $d_1$ (probability of being in the audience) and $d_2$ (average number of impressions) can be determined by solving the general problem of Equation 34 below.

$$\text{maximize } PH = -\sum\nolimits_{i=1}^{n} p_i \log(p_i) \quad \text{(Equation 34)}$$

$$\text{subject to } \begin{bmatrix} 1 & 1 & 1 & 1 & \ldots \\ 0 & 1 & 1 & 1 & \ldots \\ 0 & 1 & 2 & 3 & 4 & \ldots \end{bmatrix} \begin{bmatrix} p_1 \\ p_2 \\ p_3 \\ \ldots \end{bmatrix} = \begin{bmatrix} 1 \\ d_1 \\ d_2 \end{bmatrix}$$

The solution in terms of z notation can be expressed as shown in Equation 35 below.

$$p_i = \begin{cases} z_0, & i = 0 \\ z_0 z_1 z_2^i, & i > 0 \end{cases} \quad \text{(Equation 35)}$$

To solve for the set of $(z_j)$, three simultaneous equations are solved as shown in Equation 36 below.

$$\sum\nolimits_{i=0}^{\infty} p_i = z_0 + \sum\nolimits_{i=0}^{\infty} z_0 z_1 z_2^j = z_0 + \frac{z_0 z_1 z_2}{1 - z_2} = 1 \quad \text{(Equation 36)}$$

$$\sum\nolimits_{i=0}^{\infty} p_i = \sum\nolimits_{i=0}^{\infty} z_0 z_1 z_2^j = \frac{z_0 z_1 z_2}{1 - z_2} = d_1$$

$$\sum\nolimits_{i=0}^{\infty} i p_i = \sum\nolimits_{i=0}^{\infty} i z_0 z_1 z_2^j = \frac{z_0 z_1 z_2}{(1 - z_2)^2} = d_2$$

The solution of $(z_0, z_1, z_2)$ can be solved in closed form in Equation 37 below.

$$z_0 = 1 - d_1 \quad \text{(Equation 37)}$$

$$z_1 = \frac{d_1^2}{(1 - d_1)(d_2 - d_1)}$$

$$z_2 = 1 - \frac{d_1}{d_2}$$

For example, if among 100 individuals there is an audience size of 50 people and there is an impression count of 400 impressions, the results are shown in Equation 38 below.

$$d_0 = \frac{100}{100} z_0 = 1 - d_1 = \frac{1}{2} \quad \text{(Equation 38)}$$

$$d_1 = \frac{50}{100} \rightarrow z_0 = \frac{d_1^2}{(1 - d_1)(d_2 - d_1)} = \frac{1}{7}$$

$$d_2 = \frac{400}{100} z_0 = 1 - \frac{d_1}{d_2} = \frac{7}{8}$$

To satisfy the value of $d_0 = 1$ by the normalization constraint, all 100 people must be accounted for. In addition, since the behavior is evenly divided across the individuals, the total probability across any behavior for each individual is 1. An estimate of any probability can be calculated for each individual (e.g., $$p_2 = z_0 z_1 z_2^2 = \frac{7}{128} \approx 0.05463).$$

As that is for each individual, and there are 100 individuals in this population, the computation would estimate that an expected value of 5.4 individuals had two impressions.

A representation of Table 2 above is shown in Table 3 below.

TABLE 3

| Demo | Population | Third-Party | | Census | |
| --- | --- | --- | --- | --- | --- |
| | | Impressions | Audience | Impressions | Audience |
| 1 | $U_1$ | $R_1$ | $A_1$ | $T_1$ | $X_1$ |
| 2 | $U_2$ | $R_2$ | $A_2$ | $T_2$ | $X_2$ |
| ... | ... | ... | ... | ... | ... |
| k | $U_k$ | $R_k$ | $A_k$ | $T_k$ | $X_k$ |
| ... | ... | ... | ... | ... | ... |
| Total | U | R | A | T | X |

In the above Table 3, $R_k$ is the recorded impression count from the third-party database proprietor for the $k^{th}$ demographic, $A_k$ is the recorded audience size from the third-party database proprietor for the $k^{th}$ demographic, $T_k$ is the census impression count for the $k^{th}$ demographic, $X_k$ is the census audience size for the $k^{th}$ demographic, and $U_k$ is the universe estimate for the $k^{th}$ demographic. The non-subscripted variables are the totals across the demographic groups. For example, the variable T would be defined as $T = \sum_{k=1}^{K} T_k$ and likewise for the other variables. For example, let a specific person in the $k^{th}$ demographic be of interest. If the third-party subscriber data (e.g., the third-party subscriber data 202 of FIG. 2) is defined as the prior distribution (Q), and Census is defined as the posterior (P), by the above argument the audience sizes and impression counts are equally divided across those $U_k$ individuals. That is, the probability a specific individual in the $k^{th}$ demographic is a member of the third-party aggregated audience total is:

$$\frac{A_k}{U_k}.$$

In addition, the probability a specific individual in the $k^{th}$ demographic is a member of the third-party aggregated total impression count is:

$$\frac{X_k}{U_k}.$$

Example notations of such probabilities are shown in Equation 39 below.

$$d_0^Q = 1 d_0^P = 1 \quad \text{(Equation 39)}$$

$$d_1^Q = \frac{A_k}{U_k} d_1^P = \frac{X_k}{U_k}$$

$$d_2^Q = \frac{R_k}{U_k} d_2^P = \frac{T_k}{U_k}$$

As both audience size and impression counts are on the same domain and have the same linear constraints, just different values, the Maximum Entropy solution can be used directly to determine the KL-divergence of that individual from third party to census, as shown below in Equation 40.

$$KL(P_k:Q_k) = \sum_{j=0}^{m} d_j^P \log\left(\frac{z_j^P}{z_j^Q}\right) \quad \text{(Equation 40)}$$

In Equation 40 above, superscript notations of z represent either P or Q. Equations 41 below represent the set ($z_j$) with appropriate changes of known values.

$$z_0 = 1 - d_1 \quad \text{(Equation 41)}$$

$$z_1 = \frac{d_1^2}{(1-d_1)(d_2-d_1)}$$

$$z_2 = 1 - \frac{d_1}{d_2}$$

With an expansion of the formula, writing $$\log\frac{a}{b} = \log(a) - \log(b),$$

the full expression is shown in Equation 42 below.

$$KL(P_k:Q_k) = \sum_{j=0}^{m} d_j^P \log\left(\frac{z_j^P}{z_j^Q}\right) \quad \text{(Equation 42)}$$

$$= \sum_{j=0}^{m} d_j^P \log[\log z_j^P - \log z_j^Q]$$

$$= (d_0^P)[\log(z_0^P) - \log(z_0^Q)] \dots +$$

$$(d_1^P)[\log(z_1^P) - \log(z_1^Q)] \dots +$$

$$(d_2^P)[\log(z_2^P) - \log(z_2^Q)] \dots$$

This describes the behavior how any specific individual's distribution within the $k^{th}$ demographic may change. However, for each demographic group there are $U_k$ individuals with the same behavior. Thus $KL(P_k:Q_k)$ is multiplied by $U_k$. This is the same as adding the KL-divergence of each individually together, but since the divergences are all the same, they can just be multiplied. After multiplying, it is determined how all individuals within a demographic group may change, but the total divergence across the population is not determined. The total divergence across the population can be determined by summing across all divergences and across all demographics.

$$KL(P:Q) = \sum_{k=1}^{K} U_k(KL(P_k:Q_k)) \quad \text{(Equation 43)}$$

After all variables in Table 3 above have been substituted, Equation 43 describes the behavior of audience sizes and impression counts once minimized.

For this specific problem, census impression counts ($T_k$) and census audience sizes ($X_k$) are unknown, but subject to $\Sigma T_k = T$. As such, the following optimization in Equation 44 is solved for:

$$\text{minimize } (T_k),(X_k) \; KL(P:Q) = \sum_{k=1}^{K} U_k(KL(P_k:Q_k))$$

$$\text{subject to } \sum_{k=1}^{K} T_k = T \quad \text{(Equation 44)}$$

In examples disclosed herein, Equation 44 above includes example Equation 12 described above. The system can be solved by taking the Lagrangian as shown in Equation 45 below and solving for the case in which the 2k+1 system of equations are all zero as represented in Equation 46 below.

$$\mathcal{L} = KL(P:Q) - \lambda \cdot \left(\sum_{k=1}^{K} T_k - T\right) \quad \text{(Equation 45)}$$

$$\frac{\partial \mathcal{L}}{\partial T_k} = 0 \quad \forall k = (1, 2, \dots, K) \quad \text{(Equation 46)}$$

$$\frac{\partial \mathcal{L}}{\partial X_k} = 0 \quad \forall k = (1, 2, \dots, K)$$

$$\frac{\partial \mathcal{L}}{\partial \lambda} = 0$$

Other than the constraint of total impressions across demographics, each demographic is mutually exclusive and does not impact the other demographics. As such, the derivative of $T_k$ or $X_k$ of $\mathcal{L}$ only involves terms of the same demographic as shown in Equation 47 below, with the additional term of $\lambda$ within the impression counts to account for the census total impression count constraint.

$$\frac{\partial \mathcal{L}}{\partial T_k} = \log\left(1 - \frac{X_k}{T_k}\right) - \log\left(1 - \frac{A_k}{R_k}\right) - \lambda \frac{\partial \mathcal{L}}{\partial X_k} = \quad \text{(Equation 47)}$$

$$\log\left(\frac{X_k^2}{(T_k - X_k)(U_k - X_k)}\right) - \log\left(\frac{A_k^2}{(R_k - A_k)(U_k - A_k)}\right)$$

Notice that both the census impression counts $T_k$ and the census audience sizes $X_k$ appear within each equation. As such, the equations must be solved simultaneously when equaled to zero. The substitution of $e^\lambda \leftarrow c$, where c is the cross-demographic total census parameter value, provides Equation 48 below. In examples disclosed herein, the hat circumflex notation is used to represent an estimate or prediction of the variable of interest. For example, X in above Equation 47 represents a census-level audience size, and $\hat{X}_k$ in below Equations 48 and 49 represents an estimated or predicted census-level audience size. In addition, T in above Equation 47 represents a census-level total impression count, and $\hat{T}_k$ in below Equation 49 represents an estimated or predicted census-level total impression count.

$$\hat{X}_k = \frac{A_k}{1 - R_k\left(\frac{1}{A_k} - \frac{1}{U_k}\right)\left(\frac{c-1}{c}\right)} \quad \text{(Equation 48)}$$

In examples disclosed herein, Equation 48 above is equivalent to example Equation 10 described above. Also, $\hat{T}_k$ can be solved by the relation presented in Equation 49 below where c is the cross-demographic total census parameter value.

$$\left(1 - \frac{\hat{X}_k}{\hat{T}_k}\right) = c\left(1 - \frac{A_k}{R_k}\right) \quad \text{(Equation 49)}$$

In the examples disclosed herein, Equation 11 described above is found using Equation 49 above. In examples disclosed herein, the cross-demographic total census parameter value (c) is bound by the inequality shown in Equation 50 below.

$$0 \leq c \leq \min\left(\frac{R_k}{R_k - A_k}\right) \quad \text{(Equation 50)}$$

The inequality of Equation 50 above shows the minimization is across all demographics. This is due to the fact that as c increases, the estimate of $\hat{X}_k$ also increases and at some point, a maximum limit of the estimate of $\hat{X}_k$ as being $U_k$ is reached. The upper limit for the value c for any demographic is $$\frac{R_k}{R_k - A_k}.$$

To substantially ensure examples disclosed herein produce logically consistent results across all demographics, the value of c is maintained below the minimum limit across all demographics.

Two other points are of special concern. At c=1 there is no change in the estimate of the census impression counts $T_k$ from the third-party impression counts $R_k$ and we would have $T_k=R_k$ and $X_k=A_k$ such that the census estimates perfectly replicate the third-party information. This is as if there is no constraint on any census variable and examples disclosed herein tried to minimize the KL-divergence as much as possible. In such instances, the minimum, with no restrictions, is equal to the prior.

Another point is c=0 where the limit $X_k$ goes to zero and so does $T_k$. This has application when for some technical reason the census total impression counts is less than the third-party estimates.

Defining the frequency $$f = \frac{R}{A}$$

(as shown in Equation 7 above), makes the index k of the minimum above identical to the same index as the largest frequency $f_k$ among the demographics. Let the highest frequency among the demographics be f* as represented in Equation 51 below. In examples disclosed herein, Equation 51 below is equivalent to example Equation 8 described above.

$$0 \le c \le \left(\frac{f^*}{f^* - 1}\right) \quad \text{(Equation 51)}$$

The final equality (in terms of d's and z's) is called the canonical divergence in Information Geometry. Instead of representing a probability in the form of (p1, p2, . . . ) a distribution of impressions across audience demographics is a point in a curved geometry represented by a coordinates system. Given a model (the constraint matrix), the two coordinate systems can either be the constraint values (d's) or Lagrange multipliers (z=exp(L)). What the canonical divergence represents is a projection of one point nearest to the other within that curved space using the coordinates systems directly and not the probability distributions themselves. This makes working with a large probability distribution tractable as the projection uses a finite number of coordinates and not the possibility of an infinite number of probabilities. For example, the distribution in Equation 36 above would have coordinates d=[1, $d_0$, $d_1$] but that point in the geometry would represent a distribution with infinite number of values.

In examples disclosed herein, the canonical divergence is Equation 42, with what z's and d's equal. In such examples, the below three generalizations are applied to canonical divergence to estimate the census-level impression counts data 136 and the census-level audience sizes data 138. As such, in examples disclosed herein multiple divergences are added in a weighted sense then simultaneously minimized subject to the following constraints:

1) Examples disclosed herein project not one, but K distributions (e.g., for k demographic categories) simultaneously. Each distribution is to be weighted according to its respective population universe estimates. (e.g., Equation 43)
2) The overall projection is to be minimized, but subject to a constraint across all distributions. (e.g., Equation 44)
3) The projection can be any combination of census-level audience sizes (X) and census-level impression counts (T). However, in examples disclosed herein, an assumption can be used that census-level audience sizes and census-level impression counts are unknown for all demographic categories.

An unexpected result and technical advantage of examples disclosed herein is that even with all the generalizations corresponding to the information theory, projections, geometry, etc., the solution applied to estimating the census-level impression counts data 136 and the census-level audience sizes data 138 is quite small (e.g., Equations 48-50) compared to prior techniques based on more complex beta-binomial distribution methodologies. As such, examples disclosed herein enable solving a complex problem with many unknown quantities through computer programming using a relatively small number of lines of code with one variable (e.g., the cross-demographic total census parameter value (c)) needing to be solved (e.g., relatively fewer lines of code than used for prior techniques based on a beta-binomial solution). In addition, the computer program is faster than using prior techniques because finding a solution is only subject to constraints related to the cross-demographic total census parameter value (c) which is what is solved for by the computer program in examples disclosed herein. Example machine readable instructions to implement examples disclosed herein (e.g., based on Equations 48-50) are represented in the example programming code of FIGS. 5A-5C.

FIGS. 5A-5C include example programming code representative of machine readable instructions that may be executed to implement the example audience metrics generator 112 of FIGS. 1-3 to estimate the census-level impression counts data 136 and the census-level unique audience sizes data 138 across multiple demographics from the third-party subscriber impression counts data 132 and the third-party subscriber unique audience sizes data 134 for the multiple demographics. The example instructions of FIGS. 5A-5B may be used in a MATLAB development environment. However, similar instructions may be employed to implemented techniques disclosed herein in other development environments. In FIG. 5A, the example instructions at reference number 502 implement Equation 7 above to determine impression frequency (f). The example instructions at reference number 504 is a user-defined tolerance for a difference between a maximum cross-demographic total census parameter value (c) and a minimum cross-demographic total census parameter value (c).

The example instructions at reference numbers 506 (FIG. 5B) and 508 (FIG. 5C) implement a bisection method for univariate root-finding. Although the root-finding method implemented by the instructions at reference numbers 506 and 508 involves a single-variable bounded between two values, in other examples any other suitable built-in root finding algorithm can be used. However, the root-finding method implemented by the instructions at reference numbers 506 and 508 makes the code self-sufficient and not dependent on if you have that built-in root finding algorithm.

Example instructions at reference number 510 (FIG. 5B) implement Equation 4 above to determine the example census-level audience sizes data 138. In the illustrated example, the instructions at reference number 510 treat all values as vectors for each demographic category (k). As such, division is element-wise, and Equation 10 is used to solve for all demographic categories (k) without needing a for-loop.

Example instructions at reference number 512 (FIG. 5B) implement Equation 11 above to determine the census-level impression counts data 136. In the illustrated example, the census-level impression counts data 136 are expressed in terms of census-level pageviews (e.g., impressions of webpages). However, the instructions may be applied to determine impression counts for any type of media.

Example instructions at reference numbers 514 (FIG. 5B) and 516 (FIG. 5C) are used to implement Equation 12 above to determine the error in the T constraint between the census-level total impression count (T) and the sum of all the individual census-level impression counts ($\Sigma T_k$) for all demographic categories (k). A solution to estimating the census-level impression counts data 136 and the census-level unique audience sizes data 138 when there is zero error between the census-level total impression count (T) and the sum of all the individual census-level impression counts ($\Sigma T_k$) for all demographic categories (k).

Example instructions at reference number 518 are used to determine whether the difference between a maximum cross-demographic total census parameter value (c) and a minimum cross-demographic total census parameter value (c) in a bisection (e.g., the interval gets smaller and smaller) at a current stage in the process of finding a solution is below the user-defined tolerance defined at the instructions indicated by reference number 504.

An example of the estimating demographic-based census-level impression counts and demographic-based census-level audience sizes for census data in accordance with examples disclosed herein is described below in connection with finite universe (population) data, third-party data, and total census impression count shown in Table 4 below.

TABLE 4

| Demo | Population | Third-Party | | Census | |
|---|---|---|---|---|---|
| | | Impressions | Audience | Impressions | Audience |
| <18 | 55,000 | 4,140 | 3,113 | $T_1$ | $X_1$ |
| 18-34 | 477,000 | 23,000 | 14,323 | $T_2$ | $X_2$ |
| 35-44 | 312,000 | 13,800 | 10,324 | $T_3$ | $X_3$ |
| 55+ | 156,000 | 5,060 | 4,400 | $T_4$ | $X_4$ |
| Total | 1,000,000 | 46,000 | 32,160 | 100,000 | ??? |

The highest frequency among each demographic group is the 18-34 demographic with $$f^* = \frac{23,000}{14,323} = 1.605.$$

Therefore the search space is constrained by:

$$0 \leq c \leq 2.65 \qquad \text{(Equation 52)}$$

The maximum bound of 2.65 in Equation 52 above is determined using Equations 8 and 51 above for $f^*=1.605$. For each c within that interval, the estimated census audience sizes $\hat{X}_k$ (Equation 48) are calculated, and the estimated census impression counts (Equation 49) are calculated until the total census impressions constraint (e.g., $T_c=100,000$) is matched. At $c^*=1.4258$ the values are shown in Equation 53 below (after rounding).

$$\hat{X}=(4,978;26,779;16,813;6,604)$$

$$\hat{T}=(7,702;57,950;26,235;8,113) \qquad \text{(Equation 53)}$$

$\hat{X}$ and $\hat{T}$ in Equation 53 were computed using Equation 48 and Equation 49 for each demographic. At that $c^*$ value, the constraint that $T_k=T$ is satisfied. Table 5 below shows the final estimates of the remaining values.

TABLE 5

| Demo | Population | Third-Party | | Census | |
|---|---|---|---|---|---|
| | | Impressions | Audience | Impressions | Audience |
| <18 | 55,000 | 4,140 | 3,113 | 7,702 | 4,978 |
| 18-34 | 477,000 | 23,000 | 14,323 | 57,950 | 26,779 |
| 35-44 | 312,000 | 13,800 | 10,324 | 26,235 | 16,813 |
| 55+ | 156,000 | 5,060 | 4,400 | 8,113 | 6,604 |
| Total | 1,000,000 | 46,000 | 32,160 | 100,000 | 55,174 |

Another example of estimating demographic-based census-level impression counts and audience sizes for census data in accordance with examples disclosed herein for infinite populations is described below based on the example data in Table 6 below. An infinite population assumption has at least two valid applications in which the formulas could simplify: (1) the individual populations are unknown, and only demographic proportions of the population are known; and/or (2) the values of the table are so small, compared to even a lower bound of universe estimate populations, that taking into account a finite population is unnecessary and may even have a negligible effect of assuming an infinite population.

TABLE 6

| Demo | Population | Third-Party | | Census | |
|---|---|---|---|---|---|
| | | Impressions | Audience | Impressions | Audience |
| <18 | 5.5% | 4,140 | 3,113 | $T_1$ | $X_1$ |
| 18-34 | 47.7% | 23,000 | 14,323 | $T_2$ | $X_2$ |
| 35-44 | 31.2% | 13,800 | 10,324 | $T_3$ | $X_3$ |
| 55+ | 15.6% | 5,060 | 4,400 | $T_4$ | $X_4$ |
| Total | 100% | 46,000 | 32,160 | 100,000 | ??? |

To solve the infinite population, it is assumed that $U_k=\pi_k U$, for some population proportion $\pi_k$, and let $U \to \infty$. Equation 48 above can be used for the substitution $U_k=\pi_k U$, which is shown in Equation 54 below.

$$\hat{X}_k = \frac{A_k}{1 - R_k \left( \frac{1}{A_k} - \frac{1}{\pi_k U} \right) \left( \frac{c-1}{c} \right)} \qquad \text{(Equation 54)}$$

As $U \to \infty$, the finite population correctly drops out and what is left is shown below in Equation 55:

$$\hat{X}_k = \frac{A_k}{1 - \left(\frac{R_k}{A_k}\right)\left(\frac{c-1}{c}\right)} \quad \text{(Equation 55)}$$

$$\hat{X}_k = \frac{A_k^2 c}{R_k - c(R_k - A_k)}$$

In examples disclosed herein, Equation 55 is equivalent to the example Equation 13 described above. Substituting into Equation 49 and solving for $\hat{T}_k$ yields the analytical formula of Equation 56 below where c is the cross-demographic total census parameter value.

$$\hat{T}_k = \frac{A_k^2 c R_k}{(R_k - c(R_k - A_k))^2} \quad \text{(Equation 56)}$$

In examples disclosed herein, Equation 56 is equivalent to the example Equation 14 described above. The same inequality bounds of Equation 57 still stand.

$$0 \le c \le \min\left(\frac{R_k}{R_k - A_k}\right) \quad \text{(Equation 57)}$$

In the above problem of population proportions, instead of finite population bounds, the answer for the cross-demographic total census parameter value is c*=1.4259 with the estimated census values as shown in Table 7 below (after rounding).

TABLE 7

| Demo | Population | Third-Party Impressions | Audience | Census Impressions | Audience |
|---|---|---|---|---|---|
| <18 | 5.5% | 4,140 | 3,113 | 7,836 | 5,090 |
| 18-34 | 47.7% | 23,000 | 14,323 | 57,751 | 26,975 |
| 35-44 | 31.2% | 13,800 | 10,324 | 26,291 | 16,936 |
| 55+ | 15.6% | 5,060 | 4,400 | 8,122 | 6,625 |
| Total | 100% | 46,000 | 32,160 | 100,000 | 55,626 |

These numbers are comparable to the finite-population solution. However, in other example this may not always be the case. For example, in the infinite population assumption there is no theoretical restriction to what the individual demographic audience estimates may be. If both the finite and infinite solutions are taken to the extreme and let T→∞, the finite solution would approach $\hat{X}_k \to U_k$, as it should; but the infinite population would let $\hat{X}_k \to \infty$ as there is no finite bound to stop it.

Examples disclosed herein may also be used for census reduction. There is no restriction within the methodology that prohibits the census total to be less than the third-party total. The solution uses substantially the same procedure, with the same search space of c, and the same formulas for $X_k$ and $T_k$. Example estimates of demographic-based census-level impression counts and audience sizes for census data and an infinite population assumption can be determine based on data in Table 8 below.

TABLE 8

| Demo | Population | Third-Party Impressions | Audience | Census Impressions | Audience |
|---|---|---|---|---|---|
| <18 | 5.5% | 4,140 | 3,113 | $T_1$ | $X_1$ |
| 18-34 | 47.7% | 23,000 | 14,323 | $T_2$ | $X_2$ |
| 35-44 | 31.2% | 13,800 | 10,324 | $T_3$ | $X_3$ |
| 55+ | 15.6% | 5,060 | 4,400 | $T_4$ | $X_4$ |
| Total | 100% | 46,000 | 32,160 | 23,000 | ??? |

The solution has a cross-demographic total census parameter value c*=0.659945 with estimated census values shown in Table 9 below (after rounding).

TABLE 9

| Demo | Population | Third-Party Impressions | Audience | Census Impressions | Audience |
|---|---|---|---|---|---|
| <18 | 5.5% | 4,140 | 3,113 | 2,209 | 1,847 |
| 18-34 | 47.7% | 23,000 | 14,323 | 10,436 | 7,838 |
| 35-44 | 31.2% | 13,800 | 10,324 | 7,332 | 6,113 |
| 55+ | 15.6% | 5,060 | 4,400 | 3,023 | 2,763 |
| Total | 100% | 46,000 | 32,160 | 23,000 | 18,561 |

In this example, although the census total impression count is half of the third-party total impression count, that does not necessarily mean that the individual demographic impression counts are half. This is also true if census estimates are twice their third-party counterparts. Proportionality within the total does not imply proportionality within the individual demographic groups.

Figure 6:
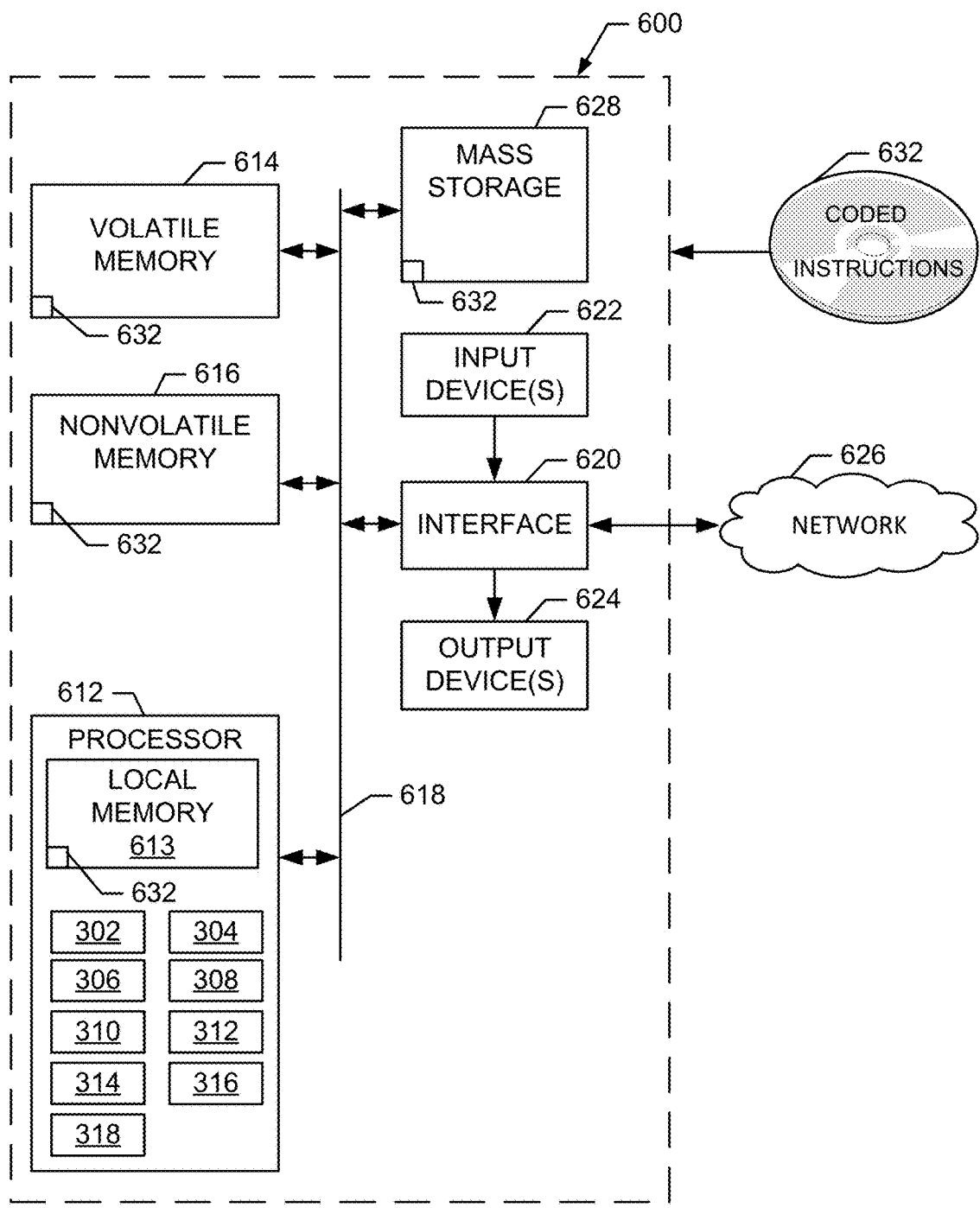
FIG. 6 is a block diagram of an example processing platform structured to execute the instructions represented in FIGS. 4 and/or 5A-5C to implement the example audience metrics generator of FIG. 3 to estimate census-level impression count data and census-level unique audience size data across multiple demographics from subscriber impression count data and subscriber unique audience size data for the multiple demographics in accordance with teachings of this disclosure.

FIG. 6 is a block diagram of an example processor platform 600 structured to execute the instructions of FIGS. 4 and 5A-5C to implement the audience metrics generator 112 of FIGS. 1-3. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor 612 may be a semiconductor based (e.g., silicon based) device. In this example, the processor 612 implements the example data interface 302, the example model applier 304, the example value generator 306, the example comparator 308, the example verifier 310, the example value tester 312, the example census audience size determiner 314, the example census impression count determiner 316, and the example communications interface 318 of FIG. 3.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

Machine executable instructions 632 represented in FIGS. 4 and 5A-5C may be stored in the mass storage device 628, in the volatile memory 614, in the non-volatile memory 616, and/or on a removable non-transitory computer readable storage medium such as a CD or DVD.

Example methods, apparatus, systems, and articles of manufacture to estimate census level impressions and unique audience sizes across demographics are disclosed herein. Further examples and combinations thereof include the following:

Example 1 includes an apparatus to determine census-based audience metrics of media across multiple demographics. The apparatus includes an audience size determiner to determine a first census-level audience size based on a third-party audience size, a third-party impression count, and a first one of a plurality of cross-demographic total census parameter values, an impression count determiner to determine a first census-level impression count based on the third-party audience size, the third-party impression count, and the first one of the plurality of cross demographic total census parameter values, and a verifier to determine whether the first one of the plurality of cross-demographic total census parameter values satisfies a constraint based on the first census-level impression count, and when the constraint is not satisfied (a) discard the first one of the cross-demographic total census parameter values, and (b) select a second one of the cross-demographic total census parameter values, the second one of the cross-demographic total census parameter values to determine a second census-level audience size and a second census-level impression count to satisfy the constraint.

Example 2 includes the apparatus of example 1, wherein the impression count determiner is to determine the first census-level impression count further based on the first census-level audience size.

Example 3 includes the apparatus of example 1, wherein the media is at least one of a webpage, an advertisement, or video.

Example 4 includes the apparatus of example 1, further including a value tester to select the first and second ones of the cross-demographic total census parameter values from a range, an upper bound constraint of the range being a peak cross-demographic total census parameter value.

Example 5 includes the apparatus of example 1, wherein the third-party audience size and the third-party impression count are based on impressions of the media, the impressions attributable to subscribers of a database proprietor.

Example 6 includes the apparatus of example 1, wherein the first census-level impression count corresponds to a first demographic, and the verifier is to determine that the first one of the plurality of cross-demographic total census parameter values satisfies the constraint when a sum of the first census-level impression count and second census-level impression counts corresponding to second demographics equal a census-level total impression count.

Example 7 includes the apparatus of example 6, wherein the census-level total impression count is based on first impressions of the media logged by an audience measurement entity, the audience measurement entity separate from a database proprietor that generates the third-party audience size and the third-party impression count based on second impressions of the media, the second impressions attributable to subscribers of the database proprietor.

Example 8 includes at least one non-transitory computer readable medium including instructions that, when executed, cause at least one processor to at least determine a first census-level audience size based on a third-party audience size, a third-party impression count, and a first one of a plurality of cross-demographic total census parameter values, determine a first census-level impression count based on the third-party audience size, the third-party impression count, and the first one of the plurality of cross demographic total census parameter values, determine whether the first one of the plurality of cross-demographic total census parameter values satisfies a constraint based on the first census-level impression count, and when the constraint is not satisfied (a) discard the first one of the cross-demographic total census parameter values, and (b) select a second one of the cross-demographic total census parameter values, the second one of the cross-demographic total census parameter values to determine a second census-level audience size and a second census-level impression count to satisfy the constraint.

Example 9 includes the at least one non-transitory computer readable medium of example 8, wherein the instructions, when executed, cause the at least one processor to determine the first census-level impression count further based on the first census-level audience size.

Example 10 includes the at least one non-transitory computer readable medium of example 8, wherein the media is at least one of a webpage, an advertisement, or video.

Example 11 includes the at least one non-transitory computer readable medium of example 8, wherein the instructions, when executed, cause the at least one processor to select the first and second ones of the cross-demographic total census parameter values from a range, an upper bound constraint of the range being a peak cross-demographic total census parameter value.

Example 12 includes the at least one non-transitory computer readable medium of example 8, wherein the third-party audience size and the third-party impression count are based on impressions of the media, the impressions attributable to subscribers of a database proprietor.

Example 13 includes the at least one non-transitory computer readable medium of example 8, wherein the first census-level impression count corresponds to a first demographic, and the instructions, when executed, cause the at least one processor to determine that the first one of the plurality of cross-demographic total census parameter values satisfies the constraint when a sum of the first census-level impression count and second census-level impression counts corresponding to second demographics equal a census-level total impression count.

Example 14 includes the at least one non-transitory computer readable medium of example 13, wherein the census-level total impression count is based on first impressions of the media logged by an audience measurement entity, the audience measurement entity separate from a database proprietor that generates the third-party audience size and the third-party impression count based on second impressions of the media, the second impressions attributable to subscribers of the database proprietor.

Example 15 includes a method to determine census-based audience metrics of media across multiple demographics. The method includes determining a first census-level audience size based on a third-party audience size, a third-party impression count, and a first one of a plurality of cross-demographic total census parameter values, determining a first census-level impression count based on the third-party audience size, the third-party impression count, and the first one of the plurality of cross demographic total census parameter values, determining whether the first one of the plurality of cross-demographic total census parameter values satisfies a constraint based on the first census-level impression count, and when the constraint is not satisfied (a) discard the first one of the cross-demographic total census parameter values, and (b) select a second one of the cross-demographic total census parameter values, the second one of the cross-demographic total census parameter values to determine a second census-level audience size and a second census-level impression count to satisfy the constraint.

Example 16 includes the method of example 15, wherein the first census-level impression count is determined based on the first census-level audience size.

Example 17 includes the method of example 15, wherein the media is at least one of a webpage, an advertisement, or video.

Example 18 includes the method of example 15, further including selecting the first and second ones of the cross-demographic total census parameter values from a range, an upper bound constraint of the range being a peak cross-demographic total census parameter value.

Example 19 includes the method of example 15, wherein the third-party audience size and the third-party impression count are based on impressions of the media, the impressions attributable to subscribers of a database proprietor.

Example 20 includes the method of example 15, wherein the first census-level impression count corresponds to a first demographic, and further including determining that the first one of the plurality of cross-demographic total census parameter values satisfies the constraint when a sum of the first census-level impression count and second census-level impression counts corresponding to second demographics equal a census-level total impression count.

Example 21 includes the method of example 20, wherein the census-level total impression count is based on first impressions of the media logged by an audience measurement entity, the audience measurement entity separate from a database proprietor that generates the third-party audience size and the third-party impression count based on second impressions of the media, the second impressions attributable to subscribers of the database proprietor.

Example 22 includes an apparatus to determine census-based audience metrics of media across multiple demographics. The apparatus includes means for determining a first census-level audience size based on a third-party audience size, a third-party impression count, and a first one of a plurality of cross-demographic total census parameter values, means for determining a first census-level impression count based on the third-party audience size, the third-party impression count, and the first one of the plurality of cross demographic total census parameter values, and means for verifying to determine whether the first one of the plurality of cross-demographic total census parameter values satisfies a constraint based on the first census-level impression count, and when the constraint is not satisfied (a) discard the first one of the cross-demographic total census parameter values, and (b) select a second one of the cross-demographic total census parameter values, the second one of the cross-demographic total census parameter values to determine a second census-level audience size and a second census-level impression count to satisfy the constraint.

Example 23 includes the apparatus of example 22, wherein the means for determining the first census-level impression count is to determine the first census-level impression count based on the first census-level audience size.

Example 24 includes the apparatus of example 22, wherein the media is at least one of a webpage, an advertisement, or video.

Example 25 includes the apparatus of example 22, further including means for selecting the first and second ones of the cross-demographic total census parameter values from a range, an upper bound constraint of the range being a peak cross-demographic total census parameter value.

Example 26 includes the apparatus of example 22, wherein the third-party audience size and the third-party impression count are based on impressions of the media, the impressions attributable to subscribers of a database proprietor.

Example 27 includes the apparatus of example 22, wherein the first census-level impression count corresponds to a first demographic, and the first one of the plurality of cross-demographic total census parameter values satisfies the constraint when a sum of the first census-level impression count and second census-level impression counts corresponding to second demographics equal a census-level total impression count.

Example 28 includes the apparatus of example 27, wherein the census-level total impression count is based on first impressions of the media logged by an audience measurement entity, the audience measurement entity separate from a database proprietor that generates the third-party audience size and the third-party impression count based on second impressions of the media, the second impressions attributable to subscribers of the database proprietor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computing system to determine census-based audience metrics of media across multiple demographics, the computing system comprising:
   memory; and
   one or more processors coupled to the memory and configured to:
   determine a plurality of cross-demographic total census parameter values based on ratios of third-party impression counts and third-party audience sizes;
   select a first cross-demographic total census parameter value as an upper bound constraint from the plurality of cross-demographic total census parameter values based on comparisons between ones of the plurality of cross-demographic total census parameter values;
   select a second cross-demographic total census parameter value from the plurality of cross-demographic total census parameter values based on the second cross-demographic total census parameter value being less than the upper bound constraint;
   determine a first census-level audience size based on the second cross-demographic total census parameter value;
   determine a first census-level impression count based on the second cross-demographic total census parameter value;
   store the first census-level audience size and the first census-level impression count in the memory; and
   send the first census-level audience size and the first census-level impression count to a network-connected device.

2. The computing system of claim 1, wherein the one or more processors are configured to:
   select between a finite universe audience model and an infinite universe audience model, and
   determine the first census-level audience size and the first census-level impression count based on the selected one of the finite universe audience model or the infinite universe audience model.

3. The computing system of claim 1, wherein the one or more processors are configured to determine whether the second cross-demographic total census parameter value satisfies a census-level total impression count constraint based on the first census-level impression count.

4. The computing system of claim 3, wherein the census-level total impression count constraint is based on a census-level total impression count collected by an audience measurement entity, and the third-party impression counts and the third-party audience sizes are provided by a database proprietor, the database proprietor separate from the audience measurement entity.

5. The computing system of claim 3, wherein, in response to the second cross-demographic total census parameter value not satisfying the census-level total impression count constraint, the one or more processors are configured to:

discard the second cross-demographic total census parameter value;
select a third cross-demographic total census parameter value from the plurality of cross-demographic total census parameter values;
based on the third cross-demographic total census parameter value, determine a second census-level audience size and a second census-level impression count to satisfy the census-level total impression count constraint; and
store the second census-level audience size and the second census-level impression count in the memory.

6. The computing system of claim 1, wherein the third-party impression counts and the third-party audience sizes correspond to impressions of audience members accessing a media item on corresponding client devices via the Internet.

7. The computing system of claim 1, wherein the one or more processors are configured to select the first cross-demographic total census parameter value as a peak cross-demographic total census parameter value of the plurality of cross-demographic total census parameter values.

8. A non-transitory computer readable medium comprising instructions that, when executed, cause a computing system to at least:
   determine a plurality of cross-demographic total census parameter values based on ratios of third-party impression counts and third-party audience sizes;
   select a first cross-demographic total census parameter value as an upper bound constraint from the plurality of cross-demographic total census parameter values based on comparisons between ones of the plurality of cross-demographic total census parameter values;
   select a second cross-demographic total census parameter value from the plurality of cross-demographic total census parameter values based on the second cross-demographic total census parameter value being less than the upper bound constraint;
   determine a first census-level audience size based on the second cross-demographic total census parameter value;
   determine a first census-level impression count based on the second cross-demographic total census parameter value;
   store the first census-level audience size and the first census-level impression count in a memory of the computing system; and
   send the first census-level audience size and the first census-level impression count to a network-connected device.

9. The non-transitory computer readable medium of claim 8, wherein the instructions, when executed, cause the computing system to:
   select between a finite universe audience model and an infinite universe audience model, and
   determine the first census-level audience size and the first census-level impression count based on the selected one of the finite universe audience model or the infinite universe audience model.

10. The non-transitory computer readable medium of claim 8, wherein the instructions, when executed, cause the computing system to determine whether the second cross-demographic total census parameter value satisfies a census-level total impression count constraint based on the first census-level impression count.

11. The non-transitory computer readable medium of claim 10, wherein the census-level total impression count constraint is based on a census-level total impression count collected by an audience measurement entity, and the third-party impression counts and the third-party audience sizes are provided by a database proprietor, the database proprietor separate from the audience measurement entity.

12. The non-transitory computer readable medium of claim 10, wherein, in response to the second cross-demographic total census parameter value not satisfying the census-level total impression count constraint, the instructions, when executed, cause the computing system to:
   discard the second cross-demographic total census parameter value;
   select a third cross-demographic total census parameter value from the plurality of cross-demographic total census parameter values;
   based on the third cross-demographic total census parameter value, determine a second census-level audience size and a second census-level impression count to satisfy the census-level total impression count constraint; and
   store the second census-level audience size and the second census-level impression count in the memory.

13. The non-transitory computer readable medium of claim 8, wherein the third-party impression counts and the third-party audience sizes correspond to impressions of audience members accessing a media item on corresponding client devices via the Internet.

14. The non-transitory computer readable medium of claim 8, wherein the instructions, when executed, cause the computing system to select the first cross-demographic total census parameter value as a peak cross-demographic total census parameter value of the plurality of cross-demographic total census parameter values.

15. A method, comprising:
   determining, by a computing system having one or more processors, a plurality of cross-demographic total census parameter values based on ratios of third-party impression counts and third-party audience sizes;
   selecting, by the computing system, a first cross-demographic total census parameter value as an upper bound constraint from the plurality of cross-demographic total census parameter values based on comparisons between ones of the plurality of cross-demographic total census parameter values;
   selecting, by the computing system, a second cross-demographic total census parameter value from the plurality of cross-demographic total census parameter values based on the second cross-demographic total census parameter value being less than the upper bound constraint;
   determining, by the computing system, a first census-level audience size based on the second cross-demographic total census parameter value;
   determining, by the computing system, a first census-level impression count based on the second cross-demographic total census parameter value;
   storing the first census-level audience size and the first census-level impression count in a memory of the computing system; and
   sending, by the computing system, the first census-level audience size and the first census-level impression count to a network-connected device.

16. The method of claim 15, further including:
   selecting between a finite universe audience model and an infinite universe audience model, and
   determining the first census-level audience size and the first census-level impression count based on the selected one of the finite universe audience model or the infinite universe audience model.

17. The method of claim 15, further including:
   determining whether the second cross-demographic total census parameter value satisfies a census-level total impression count constraint based on the first census-level impression count.

18. The method of claim 17, wherein the census-level total impression count constraint is based on a census-level total impression count collected by an audience measurement entity, and the third-party impression counts and the third-party audience sizes are provided by a database proprietor, the database proprietor separate from the audience measurement entity.

19. The method of claim 17, further including:
   in response to the second cross-demographic total census parameter value not satisfying the census-level total impression count constraint,
      discarding the second cross-demographic total census parameter value;
      selecting a third cross-demographic total census parameter value from the plurality of cross-demographic total census parameter values;
      based on the third cross-demographic total census parameter value, determining a second census-level audience size and a second census-level impression count to satisfy the census-level total impression count constraint; and
      store the second census-level audience size and the second census-level impression count in the memory.

20. The method of claim 15, wherein the third-party impression counts and the third-party audience sizes correspond to impressions of audience members accessing a media item on corresponding client devices via the Internet.

21. The method of claim 15, further including:
   selecting the first cross-demographic total census parameter value as a peak cross-demographic total census parameter value of the plurality of cross-demographic total census parameter values.

* * * * *